United States Patent
Togasaka

(10) Patent No.: US 12,527,989 B2
(45) Date of Patent: Jan. 20, 2026

(54) REMOTE LESSON SYSTEM

(71) Applicant: Techno Craft Corporation Ltd., Niigata (JP)

(72) Inventor: Masanari Togasaka, Niigata (JP)

(73) Assignee: Techno Craft Corporation Ltd., Niigata (JP)

( * ) Notice: Subject to any disclaimer, the term of this patent is extended or adjusted under 35 U.S.C. 154(b) by 564 days.

(21) Appl. No.: 18/021,667

(22) PCT Filed: Aug. 18, 2021

(86) PCT No.: PCT/JP2021/030246
§ 371 (c)(1),
(2) Date: Jul. 13, 2023

(87) PCT Pub. No.: WO2022/039202
PCT Pub. Date: Feb. 24, 2022

(65) Prior Publication Data
US 2024/0269527 A1    Aug. 15, 2024

(30) Foreign Application Priority Data
Aug. 19, 2020    (JP) .................. 2020-138772

(51) Int. Cl.
*A63B 24/00*    (2006.01)
*A63B 69/36*    (2006.01)
(Continued)

(52) U.S. Cl.
CPC ...... *A63B 24/0006* (2013.01); *A63B 24/0062* (2013.01); *A63B 24/0075* (2013.01);
(Continued)

(58) Field of Classification Search
None
See application file for complete search history.

(56) References Cited

U.S. PATENT DOCUMENTS

| | | |
|---|---|---|
| 2012/0183940 A1 | 7/2012 | Aragones et al. |
| 2014/0074425 A1 | 3/2014 | Parente et al. |
| | (Continued) | |

FOREIGN PATENT DOCUMENTS

| | | |
|---|---|---|
| JP | 6544551 B1 | 7/2019 |
| JP | 6698207 B1 | 5/2020 |

OTHER PUBLICATIONS

International Search Report issued Oct. 5, 2021 in connection with PCT/JP2021/030246.

*Primary Examiner* — Jason T Yen
(74) *Attorney, Agent, or Firm* — Akerman LLP

(57) ABSTRACT

Provided is a remote lesson system allowing a player to receive precise advices at a remote location. A remote lesson system 200 is comprised of a portable terminal 2 owned by a player P; and a cloud server 4 capable of communicating with the portable terminal 2. The portable terminal 2 includes a data analysis part for transmitting, from the portable terminal 2 to the cloud server 4, swing measurement data that have been collected by measuring the player P's motions during the play and quantified. The cloud server 4 includes an advice information generation part that generates and outputs advice information associated with the player P's motions from an output layer of a neural network when the swing measurement data have been input into an input layer of the neural network; and an advice information feeding part for transmitting such advice information to a coach terminal 6.

6 Claims, 18 Drawing Sheets

(51) Int. Cl.
*A63B 71/06* (2006.01)
*G06N 3/04* (2023.01)

(52) U.S. Cl.
CPC .......... *A63B 69/36* (2013.01); *A63B 71/0622* (2013.01); *G06N 3/04* (2013.01); *A63B 2024/0081* (2013.01); *A63B 2220/40* (2013.01); *A63B 2220/803* (2013.01); *A63B 2220/836* (2013.01); *A63B 2225/20* (2013.01); *A63B 2225/50* (2013.01)

(56) References Cited

U.S. PATENT DOCUMENTS

| | | | | |
|---|---|---|---|---|
| 2014/0335978 | A1* | 11/2014 | Dugan | A63B 69/3632 |
| | | | | 473/464 |
| 2017/0086519 | A1* | 3/2017 | Vigano' | A63B 71/141 |
| 2017/0216672 | A1* | 8/2017 | Wisbey | H04R 1/1041 |
| 2019/0060733 | A1* | 2/2019 | Benson | A63B 69/36 |
| 2020/0093418 | A1* | 3/2020 | Kluger | G16H 40/67 |
| 2020/0371598 | A1* | 11/2020 | Sadarangani | A61B 5/681 |

* cited by examiner

REMOTE LESSON SYSTEM

CROSS-REFERENCE TO RELATED APPLICATIONS

This application is a national phase of PCT/JP2021/030246, filed Aug. 18, 2021, and claims priority to Japanese Patent Application No. 2020-138772, filed on Aug. 19, 2020, the entire contents of both of which are hereby incorporated by reference.

TECHNICAL FIELD

The present invention relates to a remote lesson system enabling advising at a remote location, based on measurement data of a player such as a golf player that are collected during the actual play.

BACKGROUND ART

As shown in Patent document 1, the applicant of this application has conventionally proposed a golf club swing analysis system in which the velocities and accelerations of a golf player's wrist and hip when he or she has actually swung a golf club are measured using acceleration measurement parts incorporated in a wristwatch-type terminal and a portable terminal, the flight distance of a ball hit by the player with the golf club is calculated by a flight distance calculation part, and correlations between these velocities and accelerations of wrist and hip and the flight distance of the ball are then analyzed by an analysis part incorporated in the portable terminal.

PRIOR ART DOCUMENT

Patent Document

Patent document 1: JP-A-2020-65832

SUMMARY OF THE INVENTION

Problems to be Solved by the Invention

In the swing analysis system disclosed in Patent document 1, velocity and acceleration information of the player's wrist and hip as swing measurement data is to be stored and accumulated in a storage part every time the player actually swings the golf club during the round; after having the analysis part conduct an analysis therefrom, there can be displayed on the player's portable terminal, as swing analysis data of the best shot, velocity and acceleration information of the player's wrist and hip that is associated with a shot where the ball hit was best controlled in the player's intended direction and the shot itself resulted in a long flight distance. However, this is merely a swing analysis conducted by the analysis part incorporated in the portable terminal in a local environment; there is a problem that the player cannot receive advices about his or her motions while playing at a remote location, or be given advices from a remote location.

The present invention is to solve the above problem; and it is an object of the present invention to provide a remote lesson system allowing a player to receive precise advices about his or her motions while playing at a remote location, and allowing precise advices to be given to the player from a remote location.

Means to Solve the Problems

In order to achieve the above object, the applicant of this application invented a novel remote lesson system that was not available before.

That is, the present invention is characterized by having:
a player terminal owned by a player; and
a server device capable of communicating with the player terminal,
wherein the player terminal includes a measurement data feeding part that transmits measurement data that have been collected by measuring the player's motions during play and quantified to the server device, and
wherein the server device includes:
an advice information generation part that has an artificial intelligence function using a neural network, and generates and outputs advice information associated with the player's motions from an output layer of the neural network when the measurement data have been input into an input layer of the neural network; and
an advice information feeding part that transmits the advice information to a coach terminal as a terminal other than the player terminal.

Further, in the remote lesson system of the present invention, the server device may further include a confirmed advice information transfer part that is configured in such a manner that after the advice information feeding part has transmitted the advice information to the coach terminal, the confirmed advice information transfer part transfers confirmed advice information to the player terminal upon receiving the confirmed advice information from the coach terminal.

Effects of the Invention

According to the present invention, when a player has actually performed a motion(s) during the play, the measurement data measured by the player terminals will be acquired by the server device in real time, after which the advice information generation part will transmit the advice information associated with the player's motion(s) to the coach terminal at a remote location that is distant from the player. At that time, since the advice information is automatically generated and output by the advice information generation part using the artificial intelligence function, the player is able to receive precise advices about his or her motions while playing at a remote location.

According to the present invention, upon receiving the advice information from the server device, the coach terminal will transmit by return to the server device such advice information as it is or an edited advice information; this information will then be transferred from the server device to the player terminal(s) as the confirmed advice information about the player. Thus, advices can be precisely provided from the coach terminal at a remote location to the player terminal(s) owned by the player.

MODE FOR CARRYING OUT THE INVENTION

An embodiment of the present invention is described hereunder with reference to the accompanying drawings. The embodiment described below shall not limit the contents of the inventions described in the claims. Further, not all the configurations described below are essential elements of the present invention.

Figure 1:
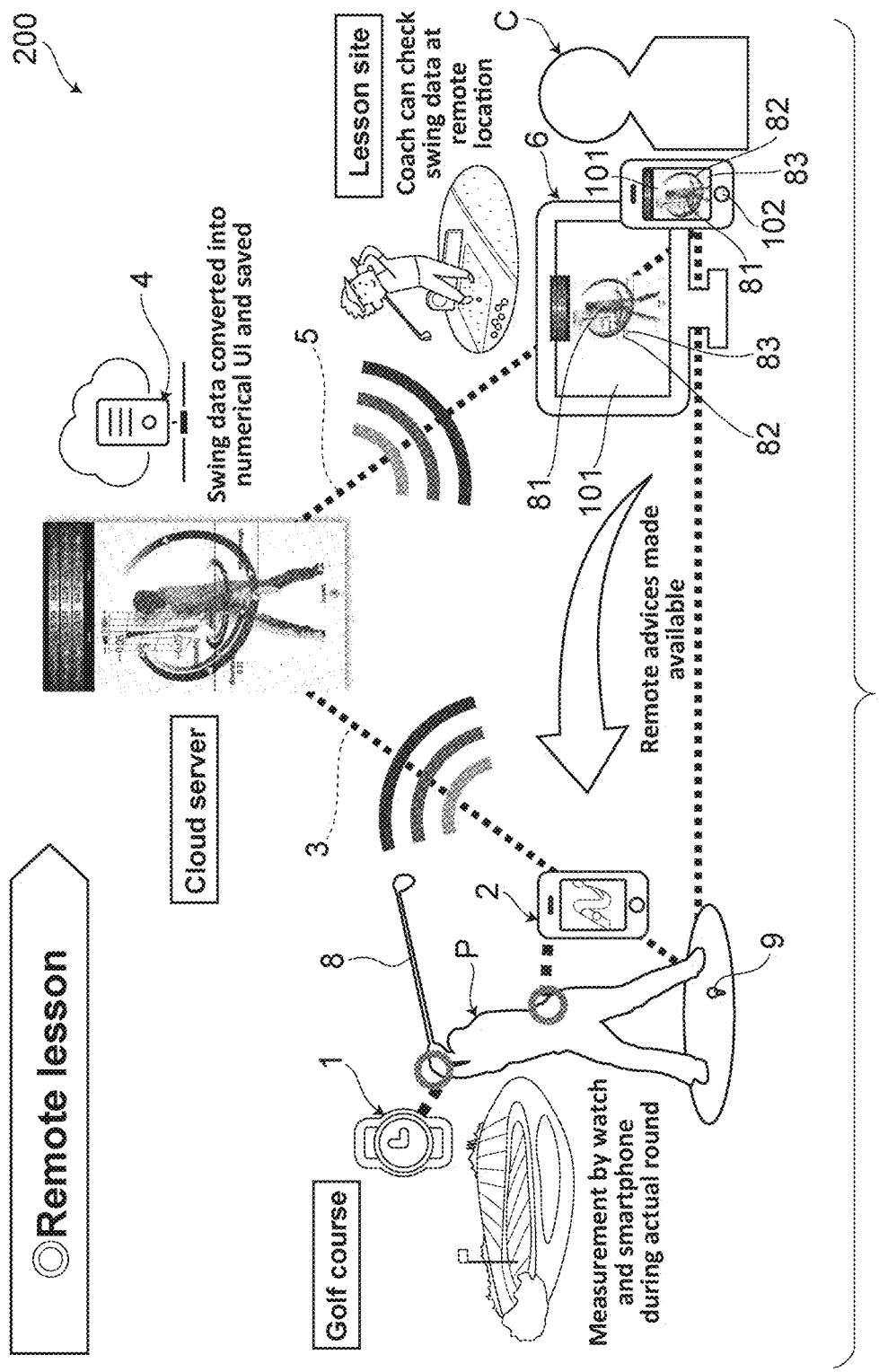
FIG. 1 is an explanatory diagram showing an overview of a remote lesson system as one embodiment of the present invention, particularly an overview of a "remote lesson."

FIG. 1 shows an overview of a system configuration related to a remote lesson system 200 of this embodiment. As shown in this diagram, main configuration elements of the remote lesson system 200 include a wristwatch-type terminal 1 and portable terminal 2 as player terminals worn by a player P during an actual round on a golf course; a cloud server 4 enabling data exchange of various data with the portable terminal 2 through a communication unit 3; and a coach terminal 6 such as a PC (personal computer) and/or portable terminal that allows a coach C at a lesson site away from the player P on the golf course to perform input operations and browse displayed contents, and enables data exchange of various data with the cloud server 4 through a communication unit 5. In this embodiment, the object to be measured by the remote lesson system 200 i.e. measurement object is the golf player P, but it may be a player in various sports other than golf. The functions of the remote lesson system 200 shown in FIG. 1 are described later in detail together with an explanation of its operation.

Figure 2:
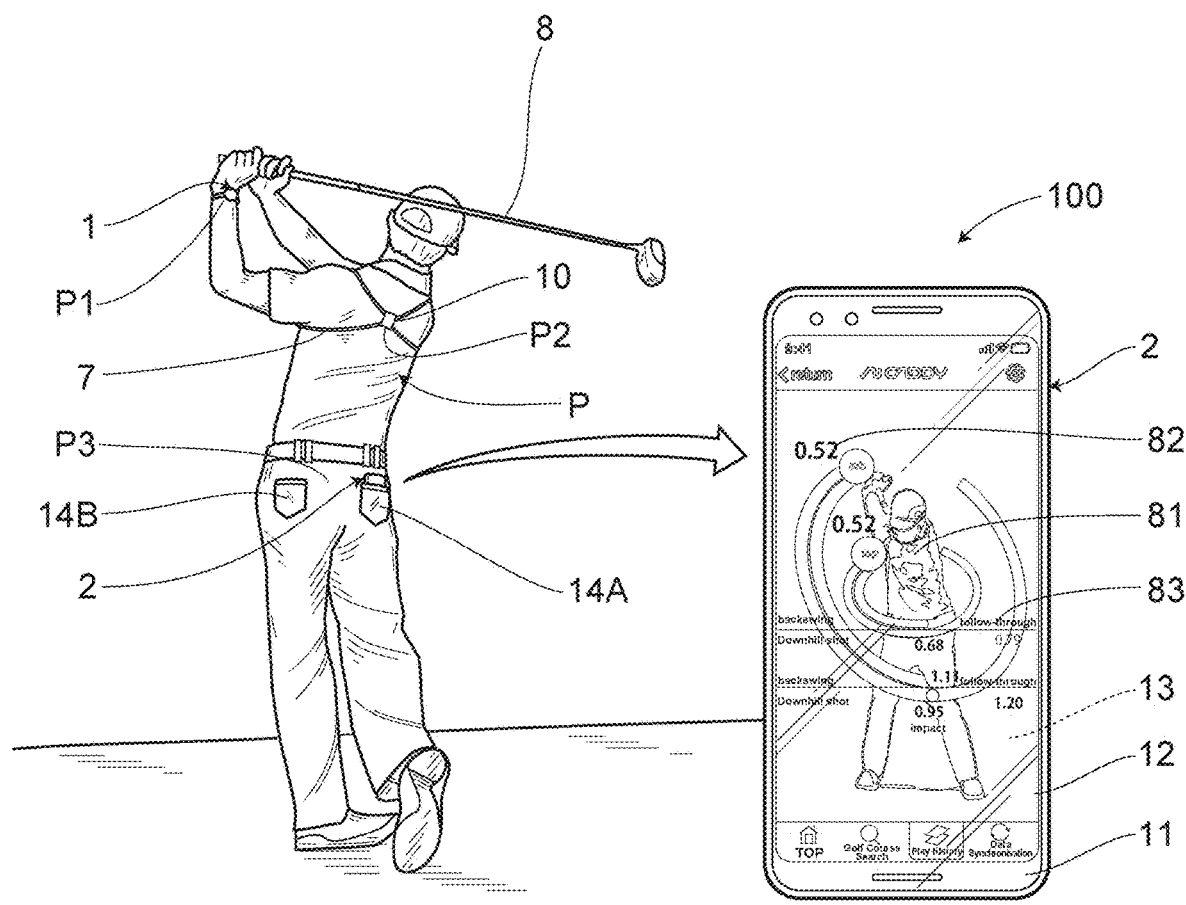
FIG. 2A is a configuration diagram showing an overview of the remote lesson system of the embodiment of the present invention, particularly an overview thereof around a player.
FIG. 2B is a diagram showing a portable terminal being used in the remote lesson system of the embodiment of the present invention.

FIGS. 2A and 2B show main configurations of the remote lesson system 200, especially those around the player P. In these drawings and as is well known, golf is a type of sport where the player P on the golf course swings a golf club 8 to hit a stationary ball 9, and competes on how few shots it will take for the player to deliver the ball into a cup (not shown). Here, the wristwatch-type terminal 1 serving as a terminal (wearable watch) is worn on, for example, a left wrist P1 where the player P transmits a swing force to the golf club 8; and as the other terminal, the portable terminal 2 is received in a pocket of the player P's lower body clothing that serves as a receiving portion, preferably in a rear pocket thereof. Further, a box-shaped 6-axis sensor unit 10 is worn at an intermediate position between the left and right scapulae on the player P's back P2, using for example a crossed string-shaped strap 7.

The wristwatch-type terminal 1 may be worn on the player P's arm, preferably wrist; in this embodiment, as shown in FIGS. 2A and 2B, the wristwatch-type terminal 1 is worn on the left wrist P1 of a right-handed player P. Here, a left-handed player P can also use the wristwatch-type terminal 1, and the wristwatch-type terminal 1 may thus be worn on the player's right wrist.

The portable terminal 2 owned by the player P has the functions of a general smartphone, where provided on a front surface of a flat main body 11 are a display part 12 for displaying images, and an operation part 13 for manual operation. In this embodiment, the portable terminal 2 is received in a right rear pocket 14A of the lower body clothing; the portable terminal 2 may be received in a left rear pocket 14B instead as it only needs to be close to a hip P3 of the player P in order to measure an acceleration or the like of the hip P3.

Figure 3:
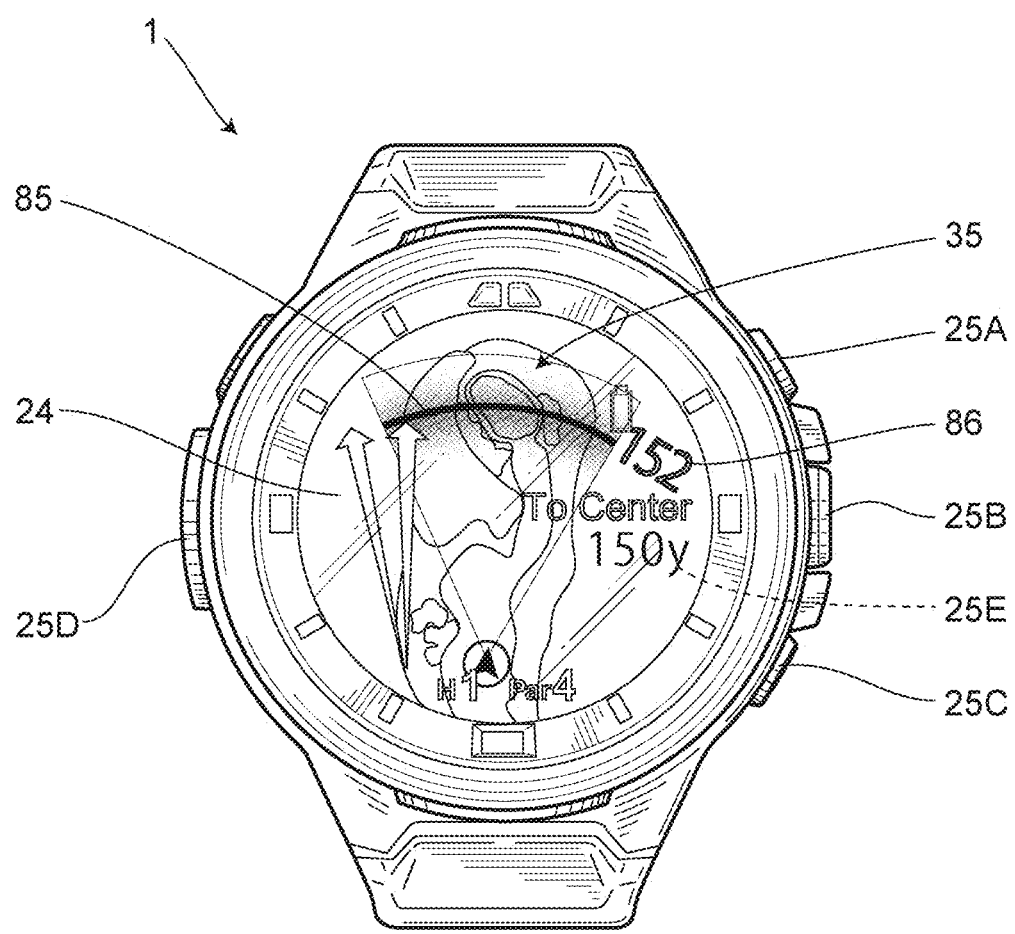
FIG. 3 is a top view of a wristwatch-type terminal in the embodiment of the present invention.
Figure 4:
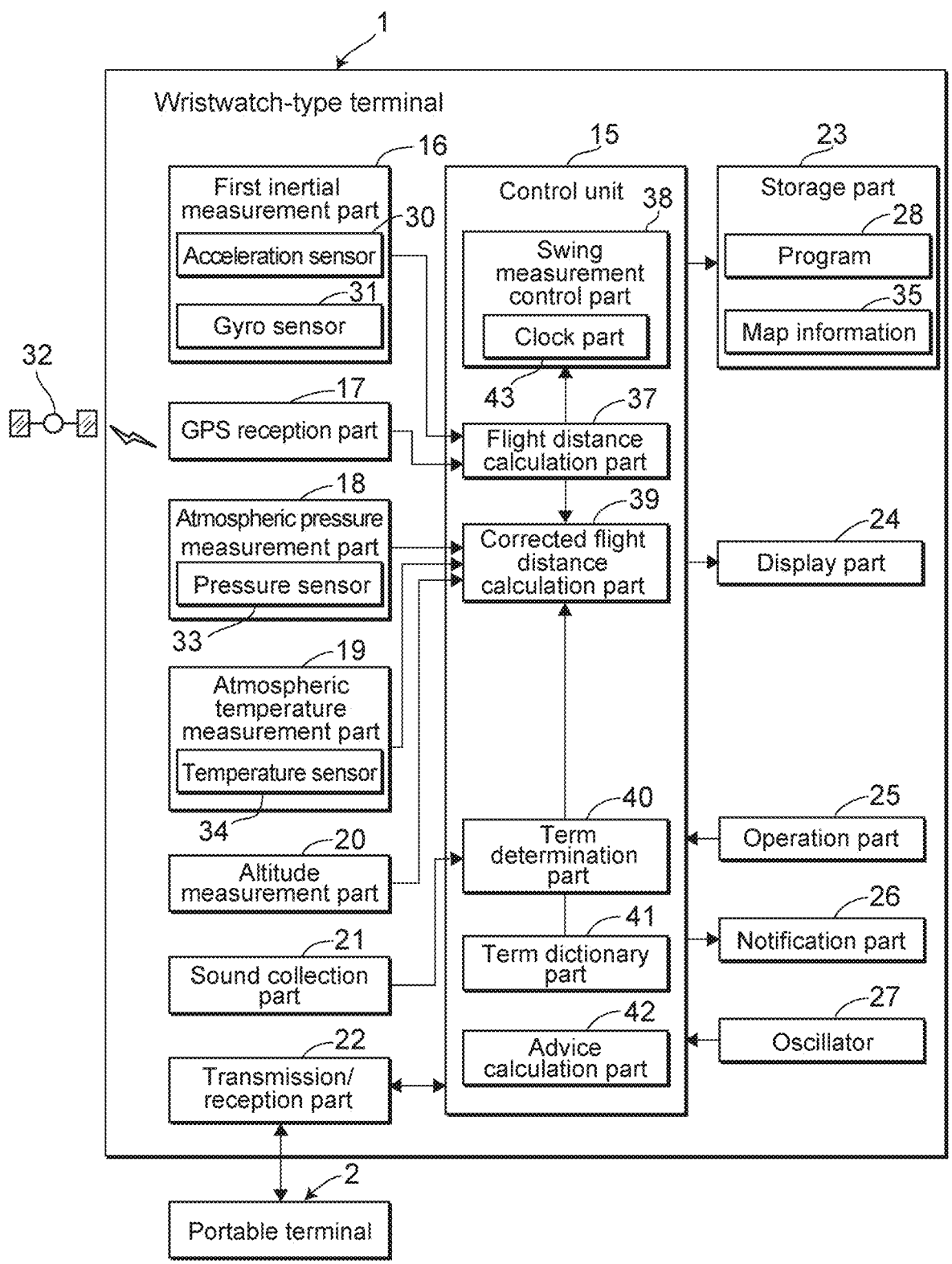
FIG. 4 is a block diagram showing an electrical configuration of the wristwatch-type terminal in the embodiment of the present invention.

FIG. 3 shows the appearance of the wristwatch-type terminal 1, and FIG. 4 shows a main electrical configuration of the wristwatch-type terminal 1. As shown in these drawings, the wristwatch-type terminal 1 includes a control unit 15, a first inertial measurement part 16, a GPS (Global Positioning System) reception part 17, an atmospheric pressure measurement part 18, an atmospheric temperature measurement part 19, an altitude measurement part 20, a sound collection part 21, a transmission/reception part 22, a storage part 23, a display part 24, an operation part 25, a notification part 26, and an oscillator 27.

The control unit 15 includes a CPU (Central Processing Unit), and controls the entire wristwatch-type terminal 1 based on a program 28 stored in the storage part 23. Each function of the wristwatch-type terminal 1 is realized by the CPU executing arithmetic processing according to the program 28. The program 28 includes, for example, a flight distance correction program for correcting a flight distance of the ball 9 hit by the player P as a result of swinging the golf club 8; and a play data transmission program for transmitting waveform data of an acceleration and angular velocity of the left wrist P1 of the player P swinging the golf club 8 to the portable terminal 2 which is a measurement unit of the remote lesson system 200.

The first inertial measurement part 16 serves as a detection unit for detecting the motions of the player P; and incorporated in the first inertial measurement part 16 are an acceleration sensor 30 and a gyro sensor 31, both of which are inertial sensors. The acceleration sensor 30 can measure the acceleration of the left wrist P1 of the player P in directions of three orthogonal axes, and the gyro sensor 31 can measure the angular velocity of the left wrist P1 of the player P around each of the three orthogonal axes. The first inertial measurement part 16 measures the acceleration and angular velocity of the left wrist P1 during a series of swinging motions of the player P wearing the wristwatch-type terminal 1. The acceleration information and angular velocity information measured by the first inertial measurement part 16 are transmitted to the control unit 15 as an acceleration waveform and angular velocity waveform of the left wrist P1 during the player P's swinging motion(s).

The GPS reception part 17 constitutes a position measurement part that acquires the current position of the wristwatch-type terminal 1; by wirelessly receiving radio waves from a plurality of satellites 32, the GPS reception part 17 measures the three-dimensional position (longitude, latitude and altitude) of the wristwatch-type terminal 1 and eventually of the player P wearing such wristwatch-type terminal 1, and then transmits this positional information to the control unit 15. A position detection device other than the GPS reception part 17 may be used as long as it can detect the current position of the wristwatch-type terminal 1. Further, the satellites 32 are equipped with an atomic clock(s). Extremely accurate time signal waves are transmitted from one or more of these satellites 32 at specific frequencies; by having the GPS reception part 17 receive these signal waves, the time axis of the wristwatch-type terminal 1 is defined. The GPS reception part 17 and the satellites 32 function as position measurement parts.

A pressure sensor 33 is incorporated in the atmospheric pressure measurement part 18; the atmospheric pressure is measured using such pressure sensor 33, and the atmospheric pressure information measured is then transmitted to the control unit 15.

A temperature sensor 34 utilizing a thermistor (not shown) is incorporated in the atmospheric temperature measurement part 19, and the atmospheric temperature is measured by such temperature sensor 34. The atmospheric temperature information measured is then transmitted to the control unit 15.

Using the pressure sensor 33 incorporated in the atmospheric pressure measurement part 18, the altitude measurement part 20 calculates the altitude above sea level (elevation) (hereafter referred to as "altitude") at the current position based on an amount of change in atmospheric pressure measured by the pressure sensor 33, and then transmits it to the control unit 15 as the altitude information of the current position. The altitude measurement part 20 converts changes in atmospheric pressure to calculate relative altitudes; if the atmospheric pressure changes due to weather conditions, the altitude as a measured value also changes. Therefore, by adjusting the altitude of the altitude measurement part 20 at a place where the exact altitude is known, it is possible to measure the altitude more accurately. For example, by adjusting the altitude at a place where the exact altitude is known in the golf course before a round, it is possible to measure the altitude more accurately during the play that follows. As the altitude at the player P's current position, there may be used the altitude of the player P's three-dimensional position (longitude, latitude and altitude) received by the GPS reception part 17.

The sound collection part 21 collects external sounds and transmits them to the control unit 15 as sound information; the sound collection part 21 may for example be a microphone. The sound collection part 21 of this embodiment is intended to collect the player P's voice, and it will suffice if it is capable of collecting human voices. The sound collection part 21 functions as a condition input part when inputting a later-described shot point condition by voice. The sound collection part 21 also functions as a first instruction input part when instructing, by voice, the start and end of acceleration measurement by the first inertial measurement part 16.

The transmission/reception part 22 enables two-way communication with other devices such as the portable terminal 2 via a wireless communication unit. Thus, the wristwatch-type terminal 1 can transmit and receive various information to and from the portable terminal 2 or the like.

The storage part 23 is configured using various storage devices such as a magnetic hard disk device and a semiconductor storage device. The storage part 23 enables writing and reading of various information such as the play data containing the acceleration information and angular velocity information measured by the first inertial measurement part 16; the positional information of the wristwatch-type terminal 1 received by the GPS reception part 17; the atmospheric pressure information measured by the atmospheric pressure measurement part 18; the atmospheric temperature information measured by the atmospheric temperature measurement part 19; the altitude information measured by the altitude measurement part 20; and the voice information input from the sound collection part 21. Further, map information 35 of the golf course is stored in advance in the storage part 23. The map information 35 is a two- or three-dimensional map containing position coordinate information, and can be updated via modification, addition, deletion and the like.

The display part 24 receives a display control signal from the control unit 15 and displays various images such as the current position of the wristwatch-type terminal 1. As shown in FIG. 3, the display part 24 is composed of a liquid crystal module and a liquid crystal panel that are exposed and provided on a front surface of a main body of the wristwatch-type terminal 1. As is well known, these liquid crystal module and liquid crystal panel enable display via a dot matrix where a large number of sub-pixels are arranged in a grid pattern. The display part 24 functions as an information presentation part when displaying and presenting later-described advice information via letters, maps or the like.

Upon operation by the player P, the operation part 25 transmits an electrical operation signal to the control unit 15. As shown in FIG. 3, the operation part 25 includes a first button 25A, a second button 25B, a third button 25C and a fourth button 25D; the display part 24 is a touch panel 25E, and a surface portion of the display part 24 also functions as the operation part 25. Here, the number of the buttons as the operation part 25 is not limited to four, and can be increased or decreased. The operation part 25 functions as a condition input part when inputting a later-described shot point condition. The operation part 25 also functions as a second instruction input part when instructing, by voice, the start and end of acceleration measurement by the first inertial measurement part 16. As for the first instruction input part by the sound collection part 21 and the second instruction input part by the operation part 25, it will suffice when at least one of them is provided.

The notification part 26 notifies the player P of, for example, the information stored in the storage part 23 by voice, and may for example be a speaker. The notification part 26 functions as an information presentation part when presenting later-described advice information by voice. The notification part 26 also functions as an output part when presenting, by sound and/or vibration, later-described swing information for the best flight distance. The output part in this case is composed of, for example, a speaker that outputs voices and/or a vibrator that generates vibration.

The oscillator 27 transmits a clock signal generated at a predetermined cycle to the control unit 15, and is composed of, for example, a silicon oscillator, a ceramic oscillator or a crystal oscillator. Further, by forming a silicon oscillator as an oscillation circuit on the same silicon chip as the control unit 15 as a microcomputer, the oscillator 27 can be built in the wristwatch-type terminal 1 at an extremely small size and a low cost.

The control unit 15 includes a flight distance calculation part 37 for calculating the actual flight distance of the ball 9 that has been hit by the head of the golf club 8 swung by the player P. A specific method for calculating the flight distance is now described with reference to FIG. 5. The first inertial measurement part 16 of the wristwatch-type terminal 1 will start measuring the acceleration and angular velocity of the wrist P1 wearing the wristwatch-type terminal 1 upon receiving the instruction to start the measurement from the sound collection part 21 or the operation part 25, and will end measuring such acceleration and angular velocity upon receiving the instruction to end the measurement from the sound collection part 21 or the operation part 25. During this period, if there are measured changes in acceleration and angular velocity corresponding to when the player P wearing the wristwatch-type terminal 1 has swung the golf club, the flight distance calculation part 37, upon receiving the measurement results from the first inertial measurement part 16, will determine that the player P has swung the club 8, and acquire the positional information of such position A where the player P has swung the golf club via the GPS reception part 17. The flight distance calculation part 37 will determine the last swing at the acquired position A as the first shot delivered to the ball 9 by the player P, and store its positional information in the storage part 23. Further, the flight distance calculation part 37 will associate the measurement results obtained from the start to end of the measurement performed by the first inertial measurement part 16 with the positional information of the position A, and then transfer them to a later-described swing measurement control part 38 which is also incorporated in the control unit 15, as acceleration and angular velocity waveforms that have occurred during a series of swinging motions at the position A.

Next, the player P will move to the point at which the ball 9 bit by the player P has landed; at such position B, the flight distance calculation part 37 will, as is the case with the position A, acquire the positional information of the position B via the GPS reception part 17 upon determining that the player P has swung the club 8 during the period from the start to end of the acceleration and angular velocity measurement performed by the first inertial measurement part 16. The flight distance calculation part 37 will determine the last swing at the acquired position B as the second shot delivered to the ball 9 by the player P, and store its positional information in the storage part 23. Further, the flight distance calculation part 37 will associate the measurement results obtained from the start to end of the measurement performed by the first inertial measurement part 16 with the positional information of the position B, and then transfer them to the swing measurement control part 38 as acceleration and angular velocity waveforms that have occurred during a series of swinging motions at the position B.

Then, the flight distance calculation part 37 will read out, from the storage part 23, the positional information of the position where the first shot was delivered and the positional information of the position where the second shot was delivered, and calculate a linear distance between the positions A and B. As a flight distance of the first shot from the position A, the linear distance calculated will be stored in the storage part 23 in association with each acceleration and angular velocity waveform that has occurred during the swinging motions at the position A. Afterward, in a similar manner, the positional information of the third shot, fourth shot and so on are acquired, and the flight distances of the second shot from the position B, third shot from a position C and so on are calculated, whereby these flight distances will then be stored as flight distance information in the storage part 23 in association with the acceleration and angular velocity waveforms that have occurred during the swinging motions at the positions B, C and so on. In this embodiment, the last swing at the position A is determined as the first shot delivered to the ball 9 by the player P. However, if the player P declares by his or her voice that he or she will deliver a shot and then actually delivers the shot afterward, the voice may be collected by the sound collection part 21, and the positional information of the position A at the time of collecting the voice may be acquired via the GPS reception part 17; or the player P may operate the operation part 25 to acquire the positional information of the position A via the GPS reception part 17.

Figure 5:
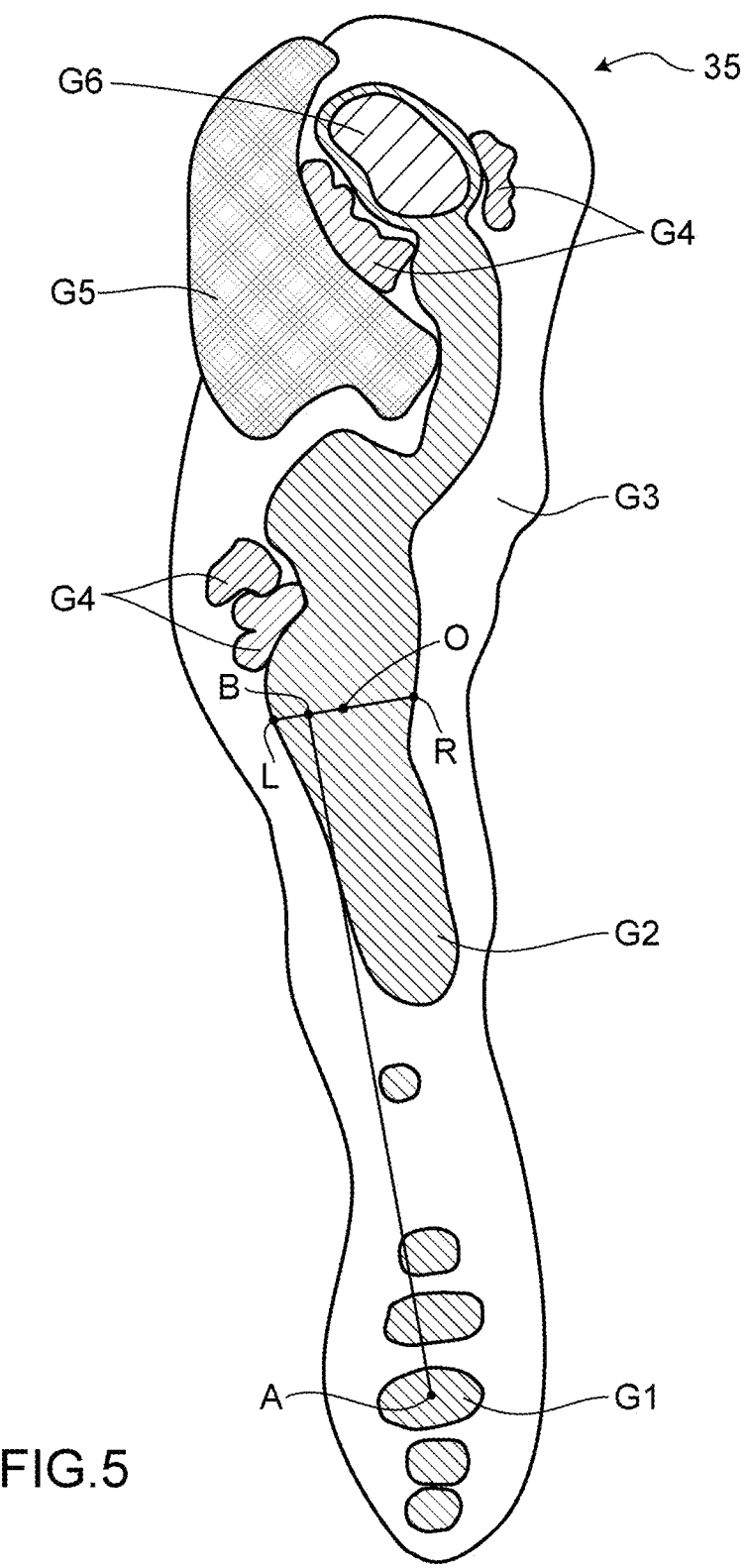
FIG. 5 is a diagram showing a positional information of a golf course in the embodiment of the present invention.

Further, the flight distance calculation part 37 calculates whether or not the ball 9 hit by the player P is deviated in a left or right direction from a center position O of the fairway. A specific calculation method is now described with regard to the first shot; as shown in FIG. 5, read out from the map information 35 are the positional information of a left end position L and a right end position R as points of intersections between two ends of a fairway G2 and a straight line orthogonal to a straight line connecting the positions A and B. Then, a middle point of a straight line connecting the left end position L and the right end position R is determined as the center position O of the fairway G2. If the position B is away from the center position O in the left direction by a given distance (e.g. 2 m) or more, it will be determined that the first shot was deviated toward the left direction; and if the position B is away from the center position O in the right direction by a given distance (e.g. 2 m as is the case in the left direction) or more, it will be determined that the first shot was deviated toward the right direction. If the position B is away from the center position O by a distance shorter than the given distance, it will be determined that the first shot was delivered with no deviation. Determination on deviation in the left or right direction will also be made with respect to the second shot, third shot and so on afterwards. Here, the given distance for determining deviation in the left or right direction can be set arbitrarily; instead of the center position O calculated by the flight distance calculation part 37, the left or right deviation determined may be a deviation from a direction intended by the player P. The direction intended by the player P is stored and set in the storage part 23 via, for example, an input from the operation part 25 by the player P. Alternatively, it may be stored and set in the storage part 23 in advance. The determination results of these deviations in the left or right direction are associated with the number information of the club 8, and they are stored in the storage part 23 as flight distance information. When a plurality of determination results have been accumulated, the flight distance calculation part 37 will calculate a rate of deviation in the left direction, a rate of deviation in the right direction and a rate of absence of deviation, and have them stored in the storage part 23 as flight distance information.

In the above example, with regard to the ball 9 hit by the player P, the deviation of the position B from the center position O of the fairway G2 on the course is calculated by the flight distance calculation part 37. However, depending on the course, there are quite a few cases where the player P intentionally hits the ball 9 to the left or right side; as another example, there may be employed a configuration where an arbitrary point on the straight line connecting the left end position L and the right end position R is determined as a reference position, and the deviation of the position B from such reference position is to be calculated by the flight distance calculation part 37. The reference position may for example be determined by the player P operating the operation part 25 and instructing in which direction he or she intended to hit the ball 9. In this case, for example, if the player intended to hit the ball 9 in the center direction of the fairway, by giving such instruction through the operation of the operation part 25, the center position O will be determined as the reference position.

As shown in FIG. 4, the control unit 15 includes a corrected flight distance calculation part 39 for calculating a corrected flight distance from the actual flight distance of the ball 9 hit by the player P, with altitude, atmospheric temperature, atmospheric pressure and shot point condition being taken into consideration. Here, a calculation method of the corrected flight distance calculation part 39 that takes the influence of altitude into consideration is described in regard to a corrected flight distance of the flight distance of the first shot. The altitude measurement part 20 measures the altitude at the position A, and transmits the measured altitude information to the corrected flight distance calculation part 39 of the control unit 15. The corrected flight distance calculation part 39 calculates a height difference between the altitude at the position A and 0 m above sea level as a reference altitude, and then, based on such height difference and by a given formula, calculates from the actual flight distance a corrected flight distance assuming that the shot was delivered at 0 m above sea level. In this embodiment, while the reference altitude is set to 0 m above sea level to calculate the corrected flight distance, this reference altitude can be set arbitrarily.

Figure 6:
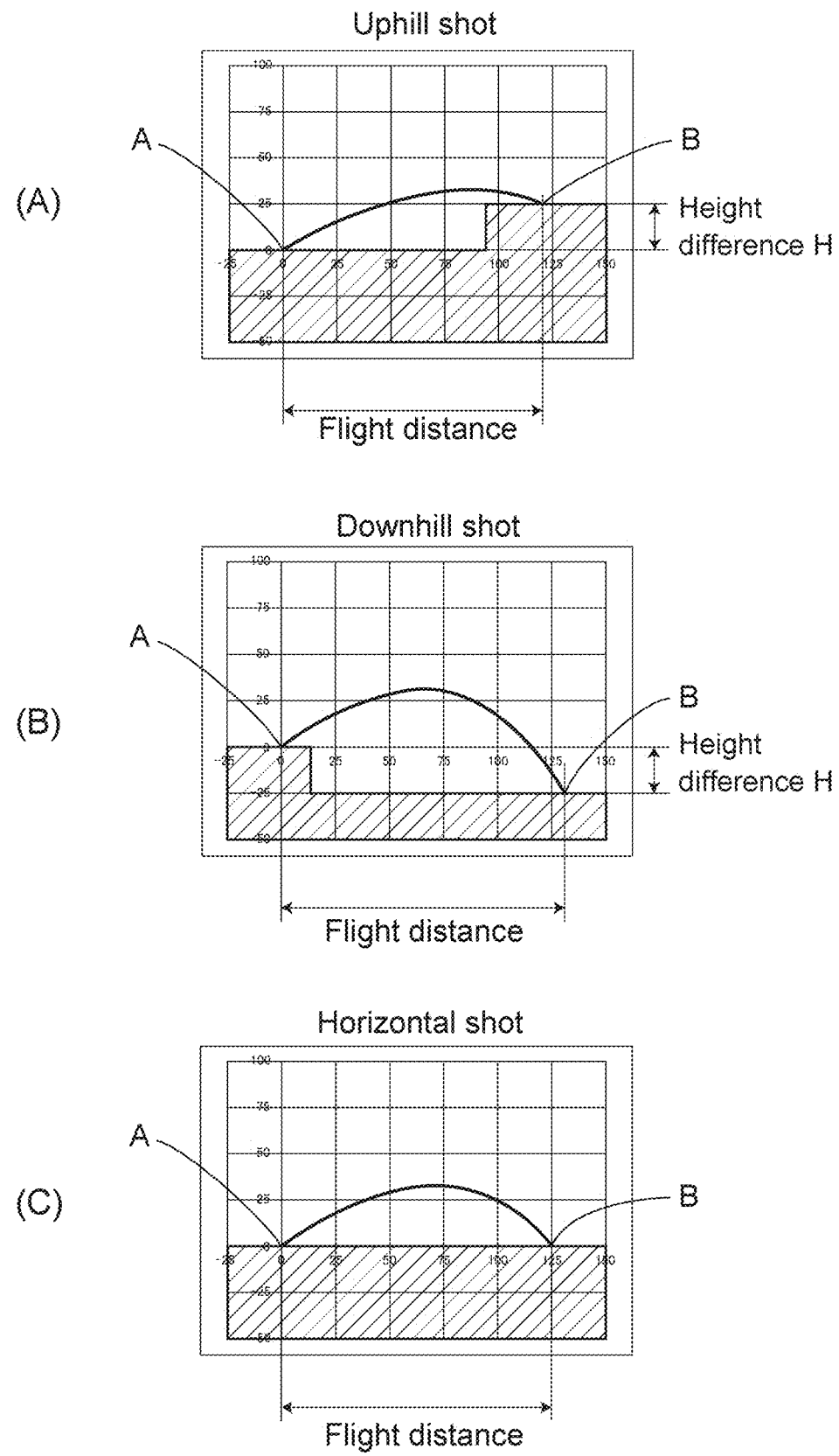
FIG. 6A is a diagram of the embodiment of the present invention, showing a height difference when the shot is an uphill shot.
FIG. 6B is a diagram of the embodiment of the present invention, showing a height difference when the shot is a downhill shot.
FIG. 6C is a diagram of the embodiment of the present invention, showing a height difference when the shot is a horizontal shot.

Further, the altitude measurement part 20 also measures the altitude at the position B, and transmits the measured altitude information to the corrected flight distance calculation part 39 of the control unit 15. The corrected flight distance calculation part 39 compares the altitude at the position A and the altitude at the position B, and calculates a height difference H if there is a difference in altitude. Then, if the position A is lower than the position B as shown in FIG. 6A, it is determined that the shot is an uphill shot; if the position A is higher than the position B as shown in FIG. 6B, it is determined that the shot is a downhill shot; and if there is no altitude difference between the positions A and B as shown in FIG. 6C, it is determined that the shot is a horizontal shot. Moreover, in the case of an uphill or downhill shot, based on the height difference H and by a given formula, calculated from the actual flight distance is a corrected flight distance assuming that there is no height difference H between the positions A and B. If the shot is determined as horizontal, the actual flight distance is regarded as the corrected flight distance.

Next, a calculation method of the corrected flight distance calculation part 39 that takes the influence of atmospheric temperature into consideration is described in regard to a corrected flight distance of the flight distance of the first shot. The atmospheric temperature measurement part 19 measures the atmospheric temperature at the position A, and transmits the measured atmospheric temperature information to the corrected flight distance calculation part 39 of the control unit 15. The corrected flight distance calculation part 39 calculates a temperature difference between the atmospheric temperature at the position A and 20 degrees Celsius as a reference atmospheric temperature, and then, based on such temperature difference and by a given formula, calculates from the actual flight distance a corrected flight distance assuming that the shot was delivered at 20 degrees Celsius. In this embodiment, while the reference atmospheric temperature is set to 20 degrees Celsius to calculate the corrected flight distance, this reference atmospheric temperature can be set arbitrarily.

Next, a calculation method of the corrected flight distance calculation part 39 that takes the influence of atmospheric pressure into consideration is described in regard to a corrected flight distance of the flight distance of the first shot. The atmospheric pressure measurement part 18 measures the atmospheric pressure at the position A, and transmits the measured atmospheric pressure information to the corrected flight distance calculation part 39 of the control unit 15. The corrected flight distance calculation part 39 calculates a pressure difference between the atmospheric pressure at the position A and 1,013 hectopascals as a reference atmospheric pressure, and then, based on such pressure difference and by a given formula, calculates from the actual flight distance a corrected flight distance assuming that the shot was delivered at 1,013 hectopascals. In this embodiment, while the reference atmospheric pressure is set to 1,013 hectopascals to calculate the corrected flight distance, this reference atmospheric pressure can be set arbitrarily.

Next, a calculation method of the corrected flight distance calculation part 39 that takes the influence of shot point condition into consideration is described in regard to a corrected flight distance of the flight distance of the first shot. In this embodiment, a shot point condition refers to the condition of the ground on the golf course on which the ball 9 to be hit by the player P is placed, and the strength and direction of the wind at the time of the shot. The condition of the ground includes a tee ground G1, fairway G2, rough G3, bunker G4, pond G5, uphill and downhill; the strength of the wind at the time of the shot includes "strong" and "weak"; and the direction of the wind at the time of the shot includes "against," "follow" and "crosswind." In addition, there may also be calculated a corrected flight distance(s) with other environmental conditions that may affect the flight distance of the ball 9 being taken into consideration.

As shown in FIG. 4, the control unit 15 includes a term determination part 40 for determining the voice information transmitted from the sound collection part 21. The control unit 15 also includes a term dictionary part 41 for storing pre-registered terms. Pre-registered terms include those indicating the shot point conditions, such as "tee ground," "fairway," "rough," "bunker," "pond," "uphill," "downhill," "against," "follow" and "crosswind." Upon receiving the voice information from the sound collection part 21, the term determination part 40 will determine whether or not the term related to the voice information is a term stored in the term dictionary part 41. If the term is a term stored in the term dictionary part 41, the term determination part 40 will transmit a term signal corresponding to such term to the corrected flight distance calculation part 39. Upon receiving the term signal, the corrected flight distance calculation part 39 will calculate, from the actual flight distance and by a given formula corresponding to such term, a corrected flight distance assuming that the shot point is the fairway G2, has no slopes and is in a windless condition. In this embodiment, while a reference shot point condition is set to that of the fairway G2 which has no slopes and is in a windless condition to calculate the corrected flight distance, this reference condition can be set arbitrarily.

There may also be employed a configuration where after having the corrected flight distance calculation part 39 calculate, in the above manner, the corrected flight distance which is the flight distance of the ball 9 at the reference altitude, reference atmospheric temperature and reference atmospheric pressure and in the reference shot point condition, a later-described advice calculation part 42 will calculate a predicted flight distance of the ball 9 by taking into account the altitude, atmospheric temperature, atmospheric pressure and shot point condition on the course on which the game is currently being played, and then present a recommended club number suitable for that flight distance through, for example, the display part 24 and the notification part 26.

A term(s) corresponding to the number of the club 8 are stored in advance in the term dictionary part 41; before delivering the shot, by inputting the number of the club 8 by voice, the number information of the club 8 that corresponds to such term (number of club 8) will be transmitted from the term determination part 40 to the corrected flight distance calculation part 39. Therefore, the flight distance calculation part 37 will, in association with the number of the club 8, transmit the actual flight distance information to the storage part 23 as flight distance data. Similarly, the corrected flight distance calculation part 39 will also associate the calculated corrected flight distance with the number of the club 8, and transmit the corrected flight distance information to the storage part 23 as corrected flight distance data. The storage part 23 that has received the flight distance information and the corrected flight distance information will store, in association with the number of the club 8, the corrected flight distance information of each shot that is associated with the flight distance information and the acceleration waveform of a swing waveform. Here, the terms stored in the term dictionary part 41 can be updated via addition, deletion, modification and the like.

In this embodiment, there is employed a method where the shot point condition and the number of the club 8 are input by voice; the shot point condition and the number of the club 8 may also be input by operating the operation part 25.

Further, in this embodiment, altitude, atmospheric temperature and atmospheric pressure are all measured, and the shot point condition is input; the items to be measured and input may be arbitrarily determined e.g. atmospheric temperature may be an item not measured, and there may also be added items other than these.

The control unit 15 includes the swing measurement control part 38 for measuring the motion of the left wrist P1 when the player P swings the golf club, by importing the waveform data of the acceleration and angular velocity from the first inertial measurement part 16 at each time determined by the clock signal from the oscillator 27. The swing measurement control part 38 has a function where upon receiving the waveform data of the acceleration and angular velocity from the first inertial measurement part 16 through the flight distance calculation part 37, the swing measurement control part 38 will have the storage part 23 store play data obtained by adding time information from a clock part 43 to such waveform data; and then when an operation to instruct synchronization of the play data is performed from the operation part 13 of the portable terminal 2 after one or all of the plays (swings) were completed, the swing measurement control part 38 will transfer the play data that have been so far stored in the storage part 23 from the transmission/reception part 22 of the wristwatch-type terminal 1 to the portable terminal 2.

The clock part 43 provided in the control unit 15 counts time at the wristwatch-type terminal 1 based on the clock signal from the oscillator 27; here, as the time information to be added to the waveform data of the acceleration and angular velocity from the first inertial measurement part 16, there are added, for example, the start time of the waveform data, the start and end times of the waveform data, or times at predetermined and fixed intervals regardless of the start and end of the waveform data. Alternatively, the time counted by the clock part 43 may be added each time the waveform data of the acceleration and angular velocity are imported from the first inertial measurement part 16. The clock part 43 here is provided in the first inertial measurement part 16 as a first clock part for counting the time at the first inertial measurement part 16 of the wristwatch-type terminal 1.

Further, the swing measurement control part 38 has a function where once the transmission/reception part 22 has received a clock inquiry signal transmitted from the operation part 13 of the portable terminal 2, the swing measurement control part 38 will transmit by return the latest time counted by the clock part 43 from the transmission/reception part 22 to the portable terminal 2. In order to simplify the operation procedure, the clock inquiry signal from the portable terminal 2 may for example be sent out when the aforementioned operation to instruct synchronization of the play data is performed, or sent out along with a certain operation at other timings.

Further, the control unit 15 includes the advice calculation part 42. Upon receiving analysis result data from a data analysis part 79 of the portable terminal 2, the advice calculation part 42 will calculate advice information for presenting advices such as tips and suggestions to the player P. The advices can be notified by voice from the notification part 26 provided in the wristwatch-type terminal 1, or displayed on the display part 24 of the wristwatch-type terminal 1 via letters, graphics, maps or the like. Whether the advice information shall be displayed on the display part 24 or notified by voice by the notification part 26, or both can be selected by operating the operation part 25.

Figure 7:
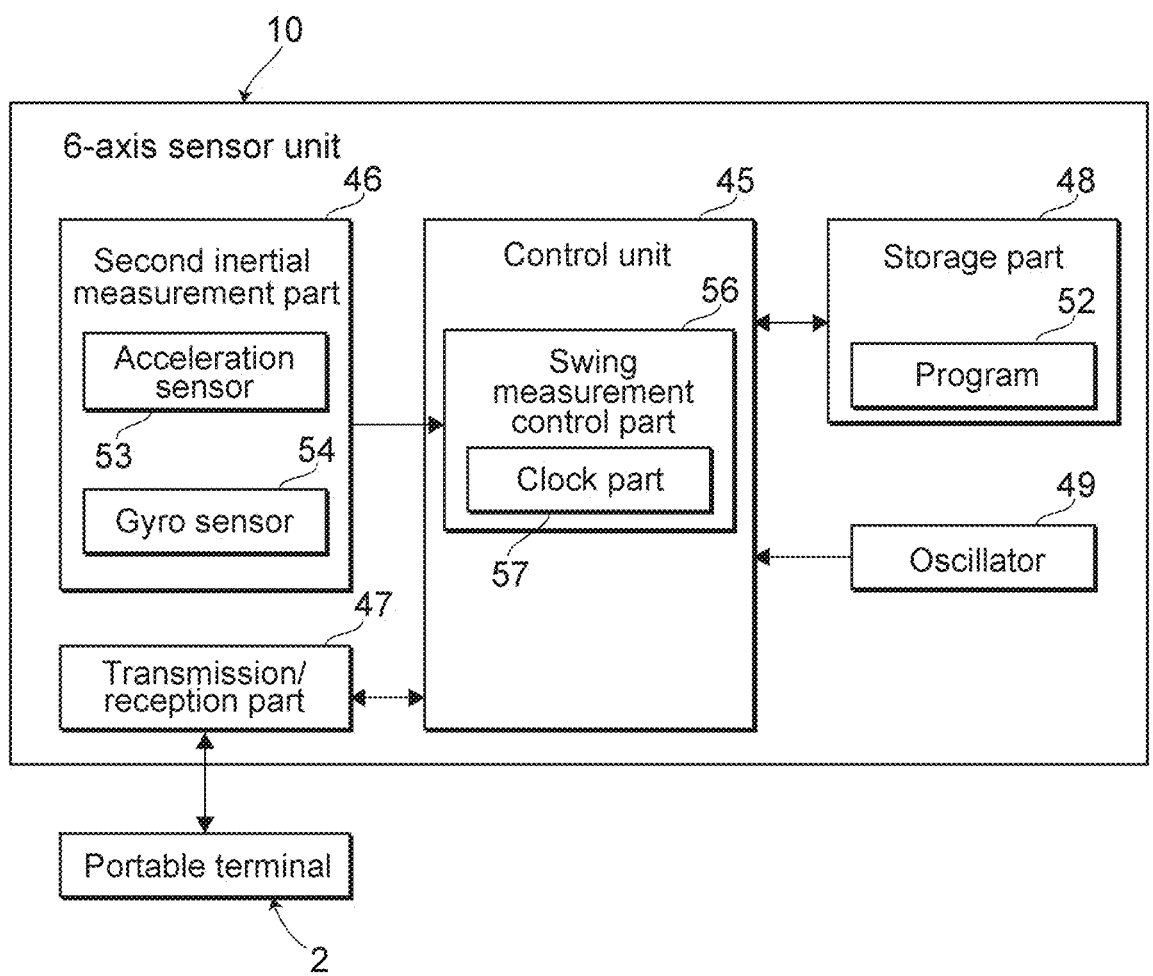
FIG. 7 is a block diagram showing an electrical configuration of a 6-axis sensor unit in the embodiment of the present invention.

FIG. 7 shows an electrical configuration of the 6-axis sensor unit 10. As shown in this diagram, the 6-axis sensor unit 10 includes a control unit 45, a second inertial measurement part 46, a transmission/reception part 47, a storage part 48 and an oscillator 49.

The control unit 45 includes a CPU (Central Processing Unit), and controls the entire 6-axis sensor unit 10 based on a program 52 stored in the storage part 48. Each function of the 6-axis sensor unit 10 is realized by the CPU executing arithmetic processing according to the program 52.

The second inertial measurement part 46 serves as a detection unit for detecting the motions of the player P; and incorporated in the second inertial measurement part 46 are an acceleration sensor 53 and a gyro sensor 54, both of which are inertial sensors. The acceleration sensor 53 can measure the acceleration in orthogonal three-axis directions, and the gyro sensor 54 can measure the angular velocity around each of the three orthogonal axes. The second inertial measurement part 46 measures the acceleration and angular velocity of the back P2 of the player P, when the player P wearing the 6-axis sensor unit 10 on the back P2 via a strap 7 performs a swinging motion(s). The acceleration information and angular velocity information measured by the second inertial measurement part 46 are transmitted to a swing measurement control part 56 of the control unit 45 as an acceleration waveform and angular velocity waveform of the back P2 during the player P's swinging motion(s).

The transmission/reception part 47 enables two-way communication between the portable terminal 2 and the 6-axis sensor unit 10 via a wired or wireless short-range communication unit.

The storage part 48 is configured using various storage devices such as a magnetic hard disk device and a semiconductor storage device. The storage part 48 enables writing and reading of various information such as the play data containing the acceleration information and angular velocity information measured by the second inertial measurement part 46.

The oscillator 49 transmits a clock signal generated at a predetermined cycle to the control unit 45, and is composed of, for example, a silicon oscillator, a ceramic oscillator or a crystal oscillator. Further, by forming a silicon oscillator as an oscillation circuit on the same silicon chip as the control unit 45 as a microcomputer, the oscillator 49 can be built in the 6-axis sensor unit 10 at an extremely small size and a low cost.

The control unit 45 includes the swing measurement control part 56 for measuring the motion of the back P2 when the player P swings the golf club, by importing the waveform data of the acceleration and angular velocity from the second inertial measurement part 46 at each time determined by the clock signal from the oscillator 49. The swing measurement control part 56 has a function where upon receiving the waveform data of the acceleration and angular velocity from the second inertial measurement part 46, the swing measurement control part 56 will have the storage part 48 store play data obtained by adding time information from a clock part 57 to such waveform data; and then when an operation to instruct synchronization of the play data is performed from the operation part 13 of the portable terminal 2 after one or all of the plays (swings) were completed, the swing measurement control part 56 will transfer the play data that have been so far stored in the storage part 48 from the transmission/reception part 47 of the 6-axis sensor unit 10 to the portable terminal 2. The clock part 57 provided in the control unit 45 counts time at the 6-axis sensor unit 10 based on the clock signal from the oscillator 49; here, as the time information to be added to the waveform data of the acceleration and angular velocity from the second inertial measurement part 46, there are added, for example, the start time of the waveform data, the start and end times of the waveform data, or times at predetermined and fixed intervals regardless of the start and end of the waveform data. Alternatively, the time counted by the clock part 57 may be added each time the waveform data of the acceleration and angular velocity are imported from the second inertial measurement part 46. The clock part 57 here is provided in the second inertial measurement part 46 as a first clock part for counting the time at the second inertial measurement part 46 of the 6-axis sensor unit 10, aside from the time at the first inertial measurement part 16 of the wristwatch-type terminal 1.

Figure 8:
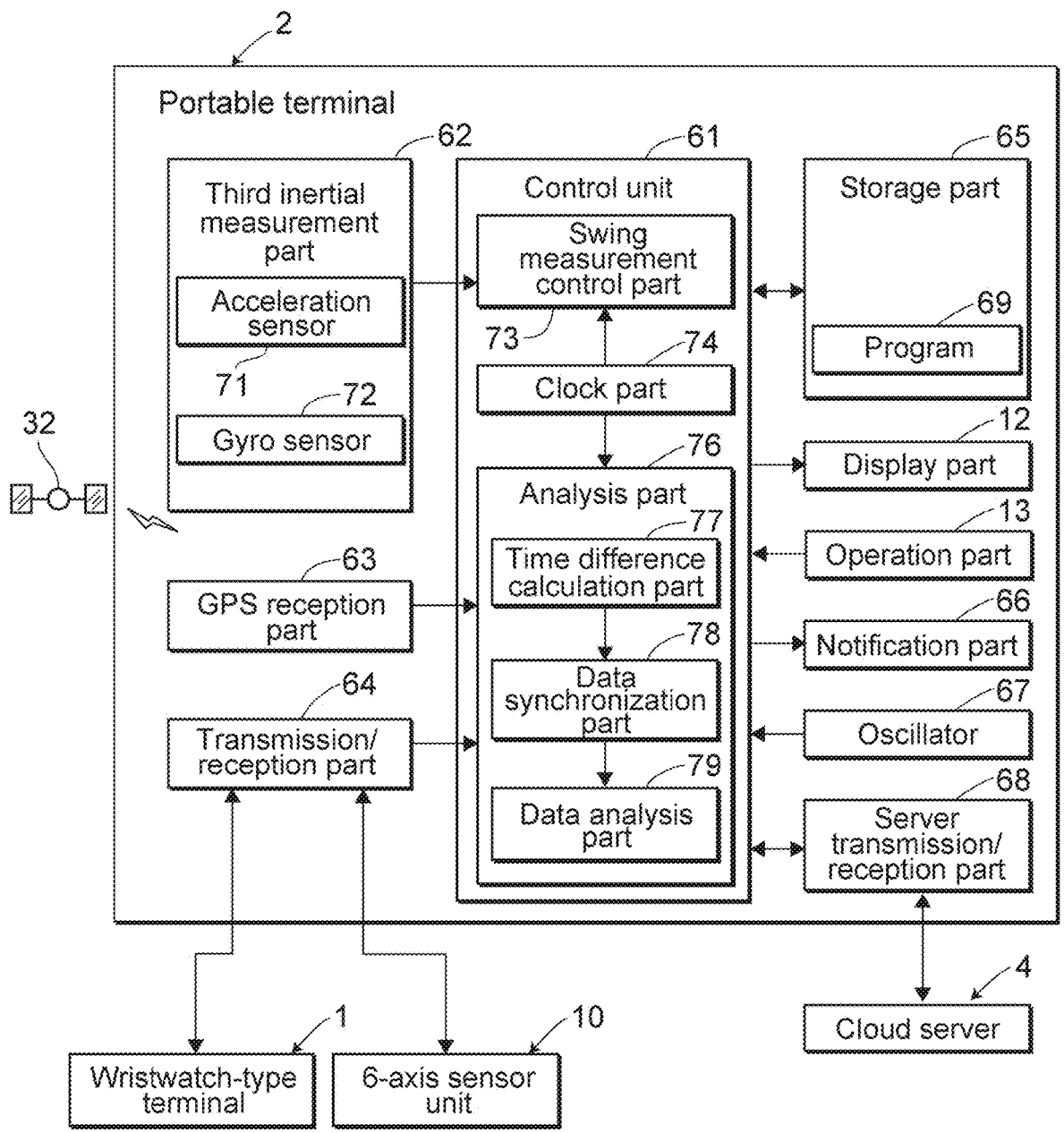
FIG. 8 is a block diagram showing an electrical configuration of a portable terminal in the embodiment of the present invention.

FIG. 8 shows an electrical configuration of the portable terminal 2. As shown in this diagram, in addition to the display part 12 and the operation part 13, the portable terminal 2 includes a control unit 61, a third inertial measurement part 62, a GPS (Global Positioning System) reception part 63, a transmission/reception part 64, a storage part 65, a notification part 66, an oscillator 67, and a server transmission/reception part 68.

The control unit 61 includes a CPU (Central Processing Unit), and controls the entire portable terminal 2 based on a program 69 stored in the storage part 65. Each function of the portable terminal 2 is realized by the CPU executing arithmetic processing according to the program 69. Further, as described above, each function of the wristwatch-type terminal 1 is realized by the program 28, and each function of the 6-axis sensor unit 10 is realized by the program 52. These programs 28, 52 and 69 are equivalent to swing analysis programs for analyzing the swinging motions of the player P; by having these programs 28, 52 and 69 executed by the control units 15, 45 and 61 as computers respectively incorporated in the wristwatch-type terminal 1, the 6-axis sensor unit 10 and the portable terminal 2, a swing analysis system in the remote lesson system 200 is realized.

The third inertial measurement part 62 serves as a detection unit for detecting the motions of the player P; and incorporated in the third inertial measurement part 62 are an acceleration sensor 71 and a gyro sensor 72, both of which are inertial sensors. The acceleration sensor 71 can measure the acceleration in orthogonal three-axis directions, and the gyro sensor 72 can measure the angular velocity around each of the three orthogonal axes. The third inertial measurement part 62 measures the acceleration and angular velocity of the hip P3 of the player P, when the player P performs a swinging motion(s) with the portable terminal 2 being received in the right rear pocket 14A. The acceleration information and angular velocity information measured by the third inertial measurement part 62 are transmitted to a swing measurement control part 73 of the control unit 61 as an acceleration waveform and angular velocity waveform of the left hip P3 during the player P's swinging motion(s).

The GPS reception part 63 constitutes a position measurement unit that acquires the current position of the portable terminal 2; by wirelessly receiving radio waves from the plurality of satellites 32, the GPS reception part 63 measures the three-dimensional position (longitude, latitude and altitude) of the portable terminal 2, and then transmits this positional information to the control unit 45. A position detection device other than the GPS reception part 63 may be used as long as it can detect the current position of the portable terminal 2. Further, the satellites 32 are equipped with an atomic clock(s). Extremely accurate time signal waves are transmitted from one or more of these satellites 32 at specific frequencies; by having the GPS reception part 63 receive these signal waves, the time axis of the portable terminal 2 is defined. As described above, since the wristwatch-type terminal 1 also has its time axis defined by receiving the time signal waves from the satellites 32, the time axes of the wristwatch-type terminal 1 and portable terminal 2 can be synchronized by utilizing the received radio waves from the satellites 32.

The transmission/reception part 64 enables two-way communication between the wristwatch-type terminal 1 and the portable terminal 2, and between the 6-axis sensor unit 10 and the portable terminal 2, via a wired or wireless short-range communication unit. Thus, the portable terminal 2 can transmit and receive data containing various information to and from the wristwatch-type terminal 1, the 6-axis sensor unit 10 and the like.

The storage part 65 is configured using various storage devices such as a magnetic hard disk device and a semiconductor storage device. In addition to the positional information of the portable terminal 2 received by the GP'S reception part 63, the storage part 65 enables writing and reading of various information such as the play data acquired from the wristwatch-type terminal 1, the portable terminal 2 and the 6-axis sensor unit 10, respectively; the flight distance information and corrected flight distance information acquired from the wristwatch-type terminal 1; and various analytical information obtained from these play data, flight distance information and corrected flight distance information.

The display part 12 is composed of a liquid crystal module and a liquid crystal panel that are exposed and provided on a front surface of a main body of the portable terminal 2. As is well known, these liquid crystal module and liquid crystal panel enable display via a dot matrix where a large number of sub-pixels are arranged in a grid pattern.

Upon operation by the player P, the operation part 13 transmits an electrical operation signal to the control unit 45. As for the portable terminal 2 in this embodiment, the display part 12 is a touch panel, and a surface portion of such display part 12 functions as the operation part 13.

As is the case with the notification part 26 provided in the wristwatch-type terminal 1, the notification part 66 functions as an output part when presenting, by sound and/or vibration, later-described swing information for the best flight distance. Such output part is composed of, for example, a speaker that outputs voices and/or a vibrator that generates vibration.

The oscillator 67 transmits a clock signal generated at a predetermined cycle to the control unit 61, and is composed of, for example, a silicon oscillator, a ceramic oscillator or a crystal oscillator. Further, by forming a silicon oscillator as an oscillation circuit on the same silicon chip as the control unit 61 as a microcomputer, the oscillator 67 can be built in the portable terminal 2 at an extremely small size and a low cost.

The server transmission/reception part 68 enables two-way communication between the cloud server 4 as a server device and the portable terminal 2 via the long-range communication unit 3 shown in FIG. 1. Thus, the portable terminal 2 can transmit and receive data containing various information to and from the cloud server 4.

The control unit 61 includes the swing measurement control part 73 for measuring the motion of the hip P3 when the player P swings the golf club, by importing the waveform data of the acceleration and angular velocity from the third inertial measurement part 62 at each time determined by the clock signal from the oscillator 67. Upon receiving the waveform data of the acceleration and angular velocity from the third inertial measurement part 62, the swing measurement control part 73 will have the storage part 65 store play data obtained by adding time information from a clock part 74 to such waveform data. The clock part 74 provided in the control unit 61 counts time at the portable terminal 2 based on the clock signal from the oscillator 67; here, as the time information to be added to the waveform data of the acceleration and angular velocity from the third inertial measurement part 62, there are added, for example, the start time of the waveform data, the start and end times of the waveform data, or times at predetermined and fixed intervals regardless of the start and end of the waveform data. Alternatively, the time counted by the clock part 74 may be added each time the waveform data of the acceleration and angular velocity are imported from the third inertial measurement part 62. The clock part 74 here is provided in the third inertial measurement part 62 as a first clock part for counting the time at the third inertial measurement part 62 of the portable terminal 2, and is also provided in a later-described analysis part 76 as a second clock part for counting a time as a reference time at the analysis part 76, aside from the time at the first inertial measurement part 16 of the wristwatch-type terminal 1 and the time at the second inertial measurement part 46 of the 6-axis sensor unit 10.

The control unit 61 also includes the analysis part 76 for analyzing a correlation between a series of swinging motions performed by the player P and flight distance based on a synchronized waveform data obtained by synchronizing each waveform data in the play data respectively imported from the wristwatch-type terminal 1, the portable terminal 2 and the 6-axis sensor unit 10, and on the flight distance information and corrected flight distance information imported from the wristwatch-type terminal 1. The analysis part 76 is equivalent to a measurement unit receiving, as various data from the multiple detection units, the play data obtained by adding the time information from the clock part 43 to the waveform data from the first inertial measurement part 16, the play data obtained by adding the time information from the clock part 57 to the waveform data from the second inertial measurement part 46, and the play data obtained by adding the time information from the clock part 74 to the waveform data from the third inertial measurement part 62; the analysis part 76 here includes a time difference calculation part 77, a data synchronization part 78 and the data analysis part 79.

The time difference calculation part 77 calculates differences between the reference time counted by the clock part 74 and the times counted by the clock part 43 of the wristwatch-type terminal 1 and the clock part 57 of the 6-axis sensor unit 10. The time difference calculation part 77 has a function where upon receiving, by return, the data of the latest time from the clock part 43 after transmitting a clock inquiry signal to such clock part 43 of the wristwatch-type terminal 1 from the transmission/reception part 64 of the portable terminal 2, the time difference calculation part 77 will calculate a difference between such time received and the latest time counted by the clock part 74 of the portable terminal 2; and where upon receiving, by return, the data of the latest time from the clock part 57 after transmitting an inquiry signal to such clock part 57 of the 6-axis sensor unit 10 from the transmission/reception part 64 of the portable terminal 2, the time difference calculation part 77 will calculate a difference between such time received and the latest time counted by the clock part 74 of the portable terminal 2. The timing at which the time difference calculation part 77 sends out the inquiry signal is not particularly limited. Further, in this embodiment, since the clock part 74 of the third inertial measurement part 62 counts the reference time itself, there is no need for the time difference calculation part 77 to calculate a time difference with respect to the clock part 74 of the third inertial measurement part 62, thereby simplifying the configuration.

The data synchronization part 78 has a function described below. That is, by for example operating the operation part 13 of the portable terminal 2 to instruct synchronization of the play data every time the player P finishes hitting the ball 9 by swinging the golf club 8, an instruction signal for acquiring the play data will be transmitted to the swing measurement control part 38 of the wristwatch-type terminal 1 and the swing measurement control part 56 of the 6-axis sensor unit 10 to respectively import the paly data stored in the storge part 23 of the wristwatch-type terminal 1 and the play data stored in the storage part 48 of the 6-axis sensor unit 10; once these play data have been imported, the swing measurement control part 73 will have them stored in the storage part 65 along with the play data obtained by adding the time information from the clock part 74 to the waveform data of the acceleration and angular velocity from the third inertial measurement part 62, after which each set of play data stored in the storage part 65 will be mutually synchronized based on the time difference calculated by the time difference calculation part 77.

The timing at which the data synchronization part 78 imports the play data from the wristwatch-type terminal 1 and the 6-axis sensor unit 10 is not particularly limited. For example, when the operation part 13 of the portable terminal 2 is operated to instruct synchronization of the play data, there may only be imported the play data from the wristwatch-type terminal 1 that already has an established communication with the portable terminal 2; apart from that, once communication has been established between the 6-axis sensor unit 10 and the portable terminal 2, the play data from the 6-axis sensor unit 10 may be automatically imported without operating the operation part 13. Alternatively, there may also be employed a configuration where once communication has been established between the 6-axis sensor unit 10 and the portable terminal 2, the play data will be able to be automatically imported not only from the 6-axis sensor unit 10 but also from the wristwatch-type terminal 1 without operating the portable terminal 2.

The data analysis part 79 analyzes a correlation between the player P's swinging motions and flight distance based on the acceleration and angular velocity of the player P's left wrist P1 measured by the first inertial measurement part 16, the acceleration and angular velocity of the player P's back P2 measured by the second inertial measurement part 46, the acceleration and angular velocity of the player P's hip P3 measured by the third inertial measurement part 62, the flight distance of the ball 9 calculated by the flight distance calculation part 37, and the corrected flight distance calculated by the corrected flight distance calculation part 39. In this embodiment, there are analyzed correlations between the flight distance of the ball 9; and so-called lag, time at each motion point, the acceleration, angular velocity and tilt of the left wrist P1, the acceleration, angular velocity and tilt of the back P2, and the acceleration, angular velocity and tilt of the hip P3, in a series of swinging motions performed by the player P.

The analysis results by the data analysis part 79 are transmitted from the server transmission/reception part 68 to the cloud server 4 as swing measurement data that haven been collected by measuring the swinging motions of the player P during the play and quantified. That is, the data analysis part 79 is equivalent to a measurement data feeding part for transmitting the swing measurement data of the player P to the cloud server 4.

As described above, the time axes of the first inertial measurement part 16 of the wristwatch-type terminal 1, the second inertial measurement part 46 of the 6-axis sensor unit 10, and the third inertial measurement part 62 of the portable terminal 2 are synchronized. When the player P has performed a series of swinging motions, there will be stored in the storage part 65, by the data synchronization part 78, the play data of the left wrist P1 obtained by adding the time information from the clock part 43 to the waveform data of the three-axis accelerations and three-axis angular velocities measured by the first inertial measurement part 16, the play data of the back P2 obtained by adding the time information from the clock part 57 to the waveform data of the three-axis accelerations and three-axis angular velocities measured by the second inertial measurement part 46, and the play data of the hip P3 obtained by adding the time information from the clock part 74 to the waveform data of the three-axis accelerations and three-axis angular velocities measured by the third inertial measurement part 62; and then by having the time difference calculation part 77 respectively calculate the differences between the times counted by the clock parts 43 and 57 and the time counted by the clock part 74, the waveform data of acceleration and angular velocity contained in each set of play data of the left wrist P1, back P2 and hip P3 will be mutually synchronized.

Figure 9:
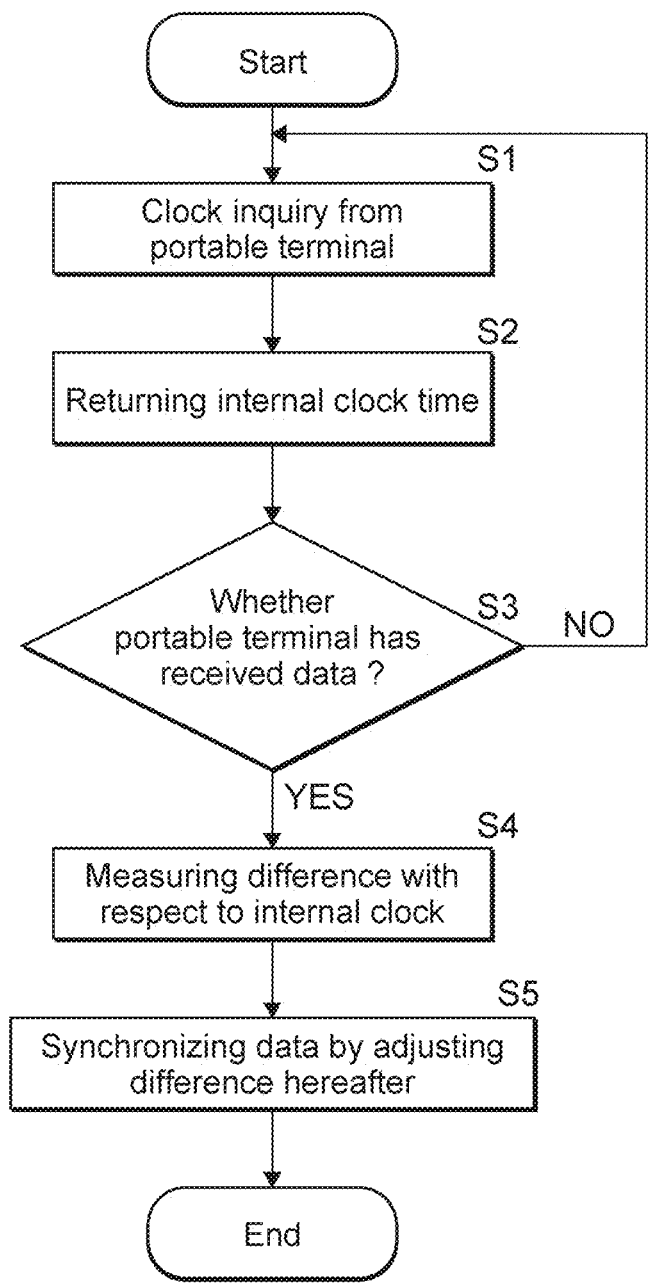
FIG. 9 is a flowchart showing an example of a data synchronization procedure in the embodiment of the present invention.

FIG. 9 shows a preferable example of such data synchronization procedure performed via the time difference calculation part 77 and the data synchronization part 78. As shown in this diagram, in a step S1, in order to make a clock inquiry from the portable terminal 2, the time difference calculation part 77 of the portable terminal 2 transmits a clock inquiry signal toward the wristwatch-type terminal 1 and the 6-axis sensor unit 10. The clock inquiry signal may be sent to the wristwatch-type terminal 1 and the 6-axis sensor unit 10 all at once, or may be sent to each at different times.

In response to this, in a step S2, the times counted by the internal clocks are returned from the wristwatch-type terminal 1 and the 6-axis sensor unit 10 to the portable terminal 2. When the clock part 43 of the wristwatch-type terminal 1 has received the clock inquiry signal, the data of the latest time counted by the clock part 43 will be transmitted by return from the transmission/reception part 22 to the portable terminal 2. Similarly, when the clock part 57 of the 6-axis sensor unit 10 has received the clock inquiry signal, the data of the latest time counted by the clock part 57 will be transmitted by return from the transmission/reception part 47 to the portable terminal 2.

In a step S3, it is determined whether or not the portable terminal 2 has received the data of the latest time. Once the transmission/reception part 22 of the portable terminal 2 has received the data of the latest times from the wristwatch-type terminal 1 and the 6-axis sensor unit 10, the process will proceed to the next step S4 where there will be measured the differences with respect to the latest time counted by the clock part 74 serving as an internal clock. In the step S4, there are respectively calculated the difference between the latest time counted by the clock part 74 of the portable terminal 2 and the latest time counted by the clock part 43 of the wristwatch-type terminal 1; and the difference between the latest time counted by the clock part 74 of the portable terminal 2 and the latest time counted by the clock part 57 of the 6-axis sensor unit 10. Here, if the portable terminal 2 fails to receive the data of the latest times from the wristwatch-type terminal 1 and the 6-axis sensor unit 10 within a certain period of time in the step S3, the process will return to the step S1 where the clock inquiry signal will be sent out again.

In this way, after the difference calculation has been completed by the time difference calculation part 77 in the step S4, the data synchronization part 78 will thereafter adjust the time differences between and thus synchronize the waveform data measured by the first inertial measurement part 16 of the wristwatch-type terminal 1, the waveform data measured by the second inertial measurement part 46 of the 6-axis sensor unit 10, and the waveform data measured by the third inertial measurement part 62 of the portable terminal 2. Therefore, for example, as in the case of the 6-axis sensor unit 10, by only installing the second inertial measurement part 46 as the detection unit and the clock part 57 as the first clock part, the waveform data measured by the second inertial measurement part 46 can be easily synchronized with the waveform data measured by the first inertial measurement part 16 and third inertial measurement part 62 as other detection units, without purposely incorporating an expensive GPS reception part that receives time signal waves from the satellites 32 as well as a power source thereof.

Figure 10:
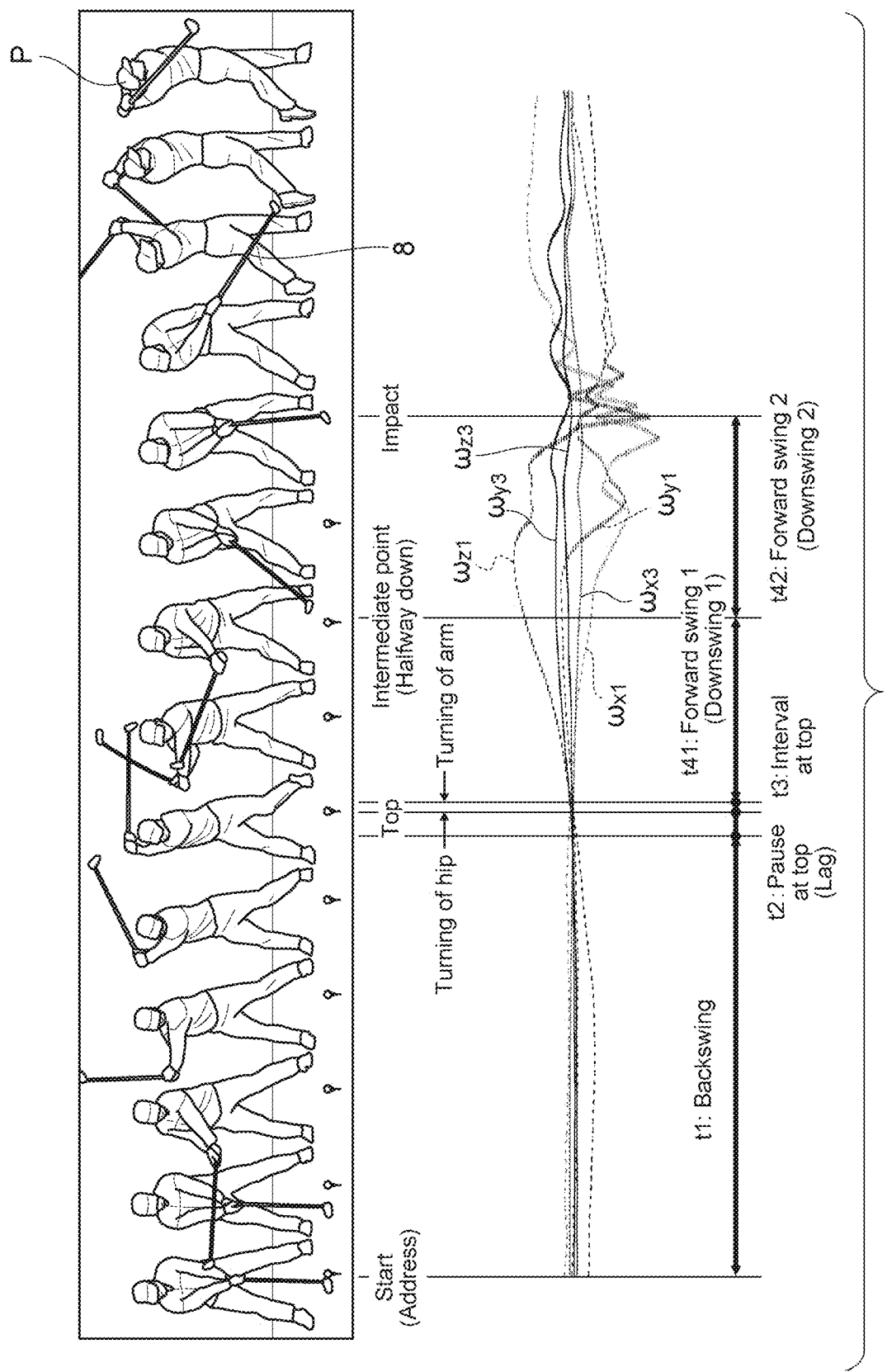
FIG. 10 is a diagram showing temporal changes in waveform data of angular velocities of the player's wrist and hip during a swinging motion(s), and time periods between motion points, in the embodiment of the present invention.

FIG. 10 shows a preferable example of an analysis result obtained via the data analysis part 79, utilizing the waveform data synchronized by the data synchronization part 78. In this diagram, during a series of swinging motions from the start (address) to follow-through of the player P, $\omega x1$ is waveform data of an x-axis angular velocity of the arm (left wrist P1); $\omega y1$ is waveform data of a y-axis angular velocity of the arm; $\omega z1$ is waveform data of a z-axis angular velocity of the arm; $\omega x3$ is waveform data of an x-axis angular velocity of the hip P3; $\omega y3$ is waveform data of a y-axis angular velocity of the hip P3; and $\omega z3$ is waveform data of a z-axis angular velocity of the hip P3 (unit; rps). Further, t1 is a backswing period starting from address to pause at the top; t2 is a pause (lag) period at the top; t3 is an interval period at the top staring from the turning of the hip P3 to the turning of the arm; t41 is a time period of the first half of the forward swing (downswing), starting from the turning of the arm to an intermediate point between the top and the impact; and t42 is a time period of the latter half of the forward swing (downswing), starting from the intermediate point between the top and the impact to the impact.

The data analysis part 79 precisely analyzes the player P's swinging motions based on the waveform data of the player P's left wrist P1, back P2 and hip P3 that have been synchronized by the data synchronization part 78. In the example shown in FIG. 10, the data analysis part 79 analyzes changes in the waveform data $\omega x1$, $\omega y1$ and $\omega z1$ of the three-axis angular velocities of the player P's arm that have been synchronized by the data synchronization part 78, and changes in the waveform data $\omega x3$, $\omega y3$ and $\omega z3$ of the three-axis angular velocities of the player P's hip P3 that have likewise been synchronized by the data synchronization part 78, thereby identifying the time at each motion point from the start of the swing delivered by the player P to the follow-through after the impact, and thus calculating a time between two motion points obtained therefrom. As shown in FIGS. 2A and 2B for example, the calculation results by the data analysis part 79 are screen-displayed on the display part 12 of the portable terminal 2. Along with an image 81 of the player P, the backswing period t1, the time period from the top to the impact t41+t42, a follow-through time period from the impact to the end of the swing (not shown) and the like are displayed on the display part 12 in an easy-to-understand manner with a combination of letters 82 and numbers 83.

Further, these calculation results by the data analysis part 79 based on the swing measurement data are such that the measurement results of the player P's swinging motions during the play will eventually be transmitted from the cloud server 4 to the coach terminal 6 as swing measurement result display information to be displayed on the coach terminal 6. At this time, the cloud server 4 may generate the swing measurement result display information by utilizing the swing measurement data transmitted from the data analysis part 79, and then transmit such information to the coach terminal 6; or directly transfer the swing measurement result display information sent from the data analysis part 79 of the portable terminal 2 to the coach terminal 6. As shown in FIG. 1, the coach terminal 6 includes a display part 101 and an operation part 102 as is the case with a general PC or mobile terminal; a screen that is displayed on the display part 101 of the coach terminal 6 and shows the calculation results by the data analysis part 79 based on the swing measurement result display information sent out from the cloud server 4 to the coach terminal 6, may or may not be identical to a screen displayed on the display part 12 of the portable terminal 2.

Figure 11:
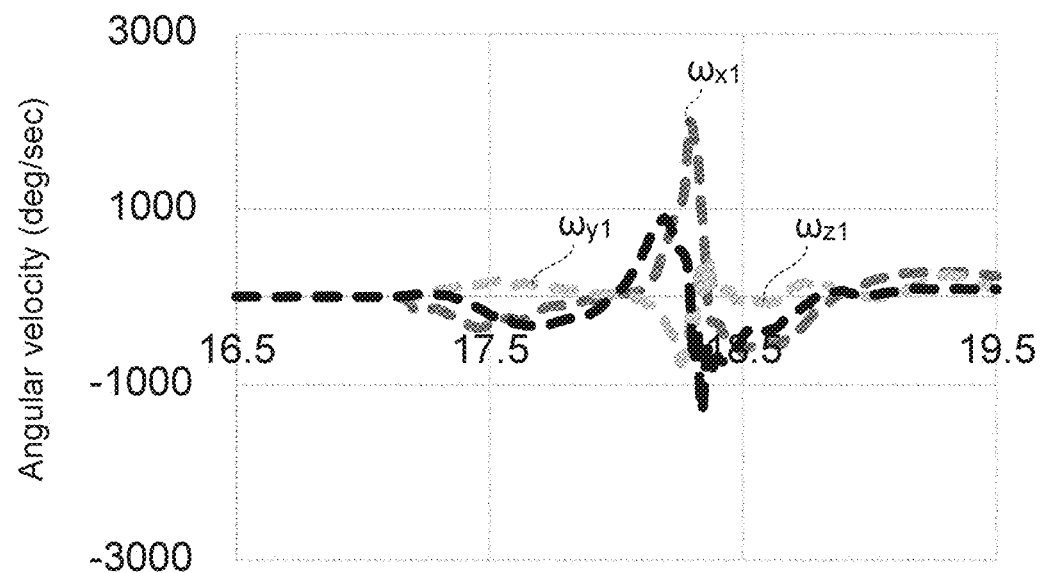
FIG. 11 is a graph showing temporal changes in waveform data of angular velocities of the player's wrist during the swinging motion(s) in the embodiment of the present invention.
Figure 12:
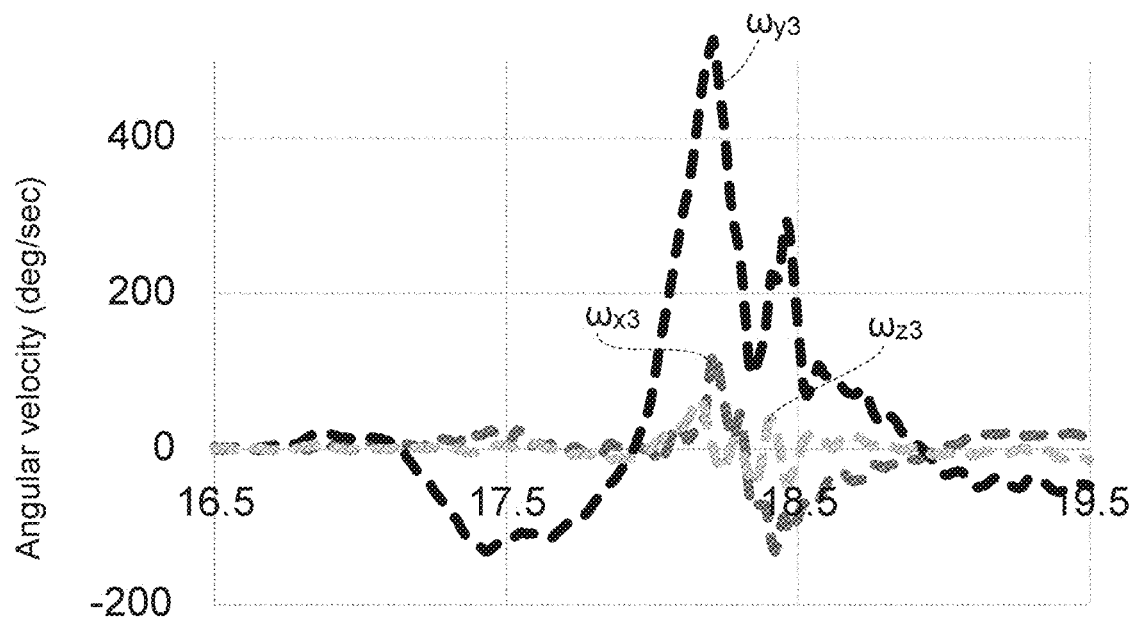
FIG. 12 is a graph showing temporal changes in waveform data of angular velocities of the player's hip during the swinging motion(s) in the embodiment of the present invention.
Figure 13:
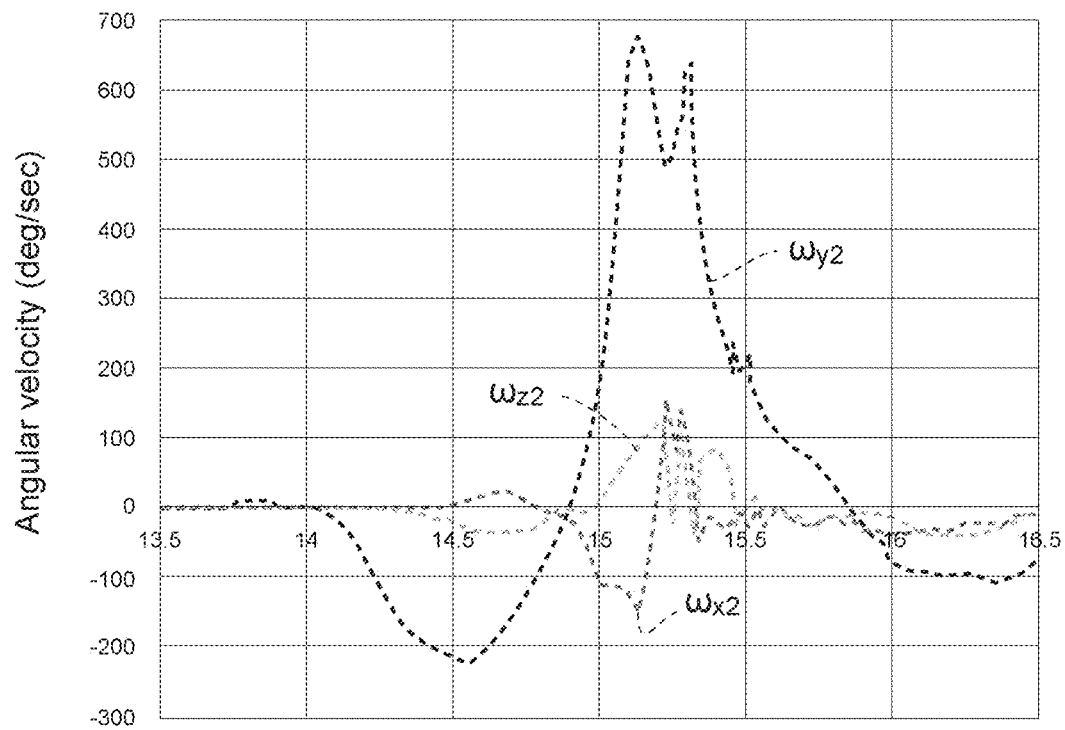
FIG. 13 is a graph showing temporal changes in waveform data of angular velocities of the player's back during the swinging motion(s) in the embodiment of the present invention.
Figure 14:
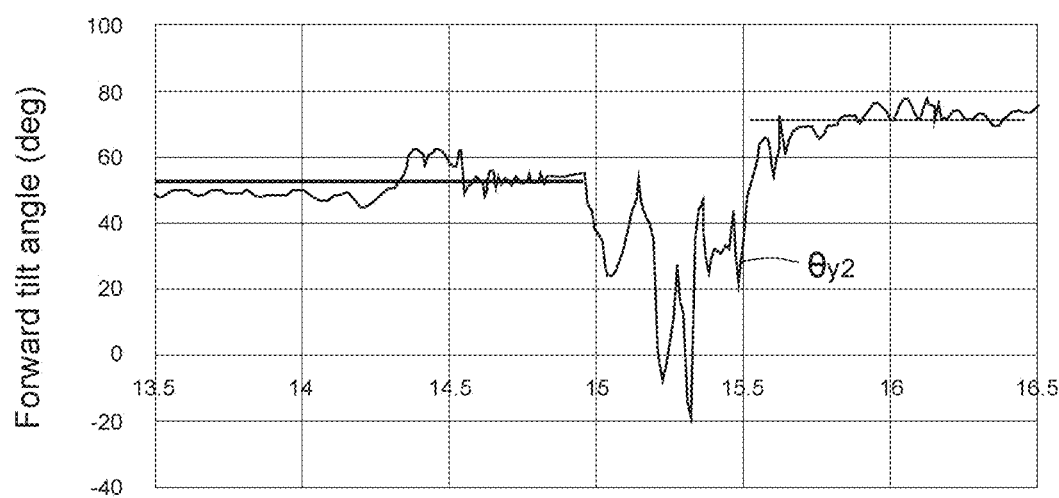
FIG. 14 is a graph showing temporal changes in a forward tilt angle of the player during the swinging motion(s) in the embodiment of the present invention.
Figure 15:
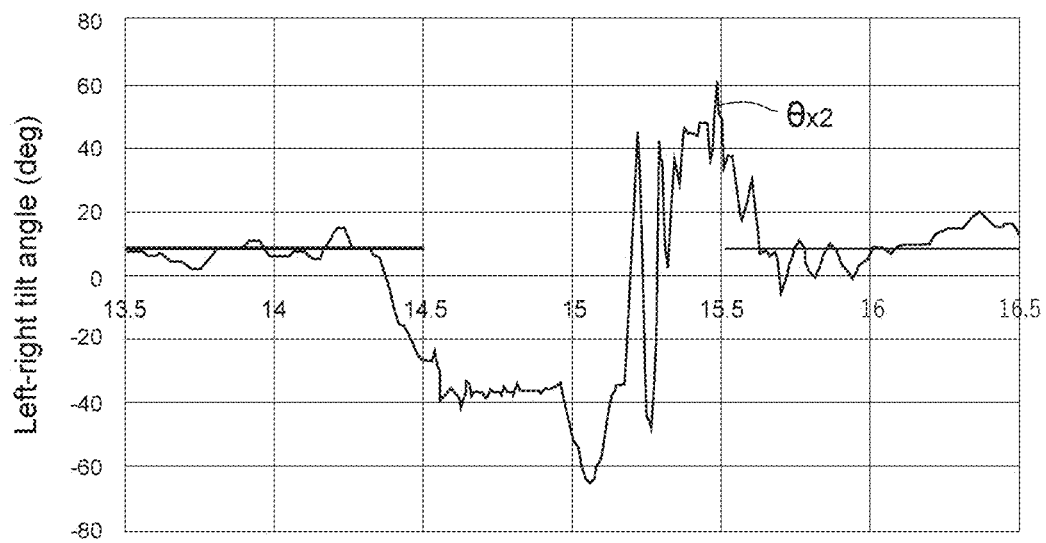
FIG. 15 is a graph showing temporal changes in a left-right tilt angle of the player during the swinging motion(s) in the embodiment of the present invention.

In order to analyze the swinging motions of the player P, the data analysis part 79 may also utilize the waveform data of the three-axis accelerations and three-axis angular velocities of the left wrist P1 that have been synchronized by the data synchronization part 78, the waveform data of the three-axis accelerations and three-axis angular velocities of the hip P3 that have likewise been synchronized by the data synchronization part 78, and the waveform data of the three-axis accelerations and three-axis angular velocities of the back P2 that have likewise been synchronized by the data synchronization part 78. FIG. 11 shows the waveform data $\omega x1$ of the x-axis angular velocity of the left wrist P1, the waveform data $\omega y1$ of the y-axis angular velocity of the left wrist P1, and the waveform data $\omega z1$ of the z-axis angular velocity of the left wrist P1, during the swinging motions performed by the player P. FIG. 12 shows the waveform data $\omega x3$ of the x-axis angular velocity of the hip P3, the waveform data $\omega y3$ of the y-axis angular velocity of the hip P3, and the waveform data $\omega z3$ of the z-axis angular velocity of the hip P3, during the swinging motions performed by the player P. FIG. 13 shows waveform data $\omega x2$ of an x-axis angular velocity of the back P2, waveform data $\omega y2$ of a y-axis angular velocity of the back P2, and waveform data $\omega z2$ of a z-axis angular velocity of the back P2, during the swinging motions performed by the player P. FIG. 14 shows a forward tilt angle $\theta y2$ obtained from the waveform data of the acceleration of the back P2 during the player P's swinging motions. FIG. 15 shows a left-right tilt angle $\theta x2$ obtained from the waveform data of the acceleration of the back P2 during the player P's swinging motions.

Figure 16:
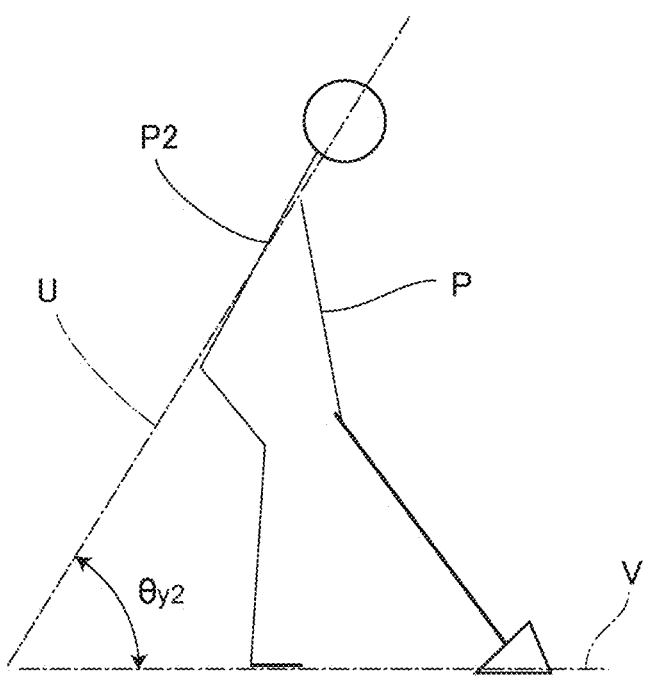
FIG. 16 is a drawing explaining the forward tilt angle of the player during the swinging motion(s) in the embodiment of the present invention.
Figure 17:
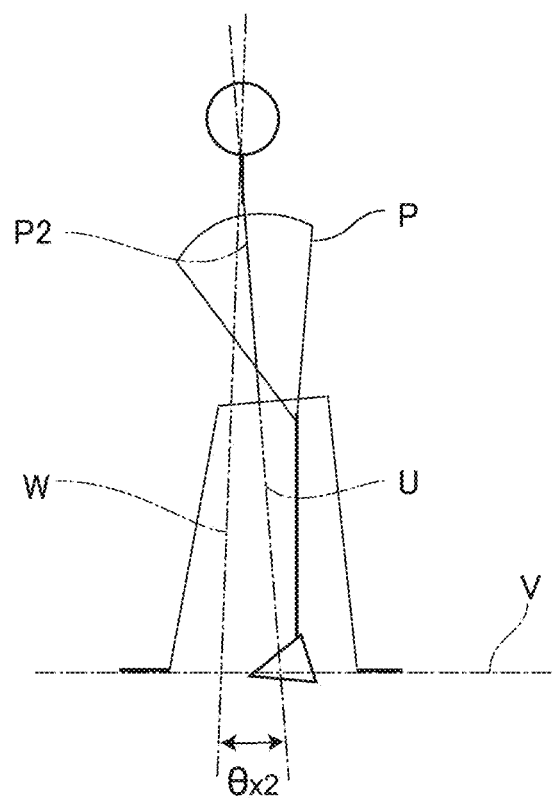
FIG. 17 is a drawing explaining the left-right tilt angle of the player during the swinging motion(s) in the embodiment of the present invention.

As shown in FIG. 16, the forward tilt angle $\theta y2$ is an angle formed by a horizontal plane V and a perpendicular plane U along the player P's back. P2. Further, as shown in FIG. 17, the left-right tilt angle $\theta x2$ is an angle formed by a vertical plane W and the perpendicular plane U along the player P's back P2.

The data analysis part 79 calculates a three-axis composite acceleration of the left wrist P1 and a three-axis composite acceleration of the hip P3 when the player P has performed a series of swinging motions, based on the waveform data of the three-axis accelerations of the left wrist P1 from the first inertial measurement part 16 that have been synchronized by the data synchronization part 78, and on the waveform data of the three-axis accelerations of the hip P3 from the third inertial measurement part 62 that have likewise been synchronized by the data synchronization part 78. Further, as described above, by the flight distance calculation part 37 of the wristwatch-type terminal 1, the actual flight distance of the ball 9 is to be stored in the storage part 23 of the wristwatch-type terminal 1 in association with the number of the club 8. The data analysis part 79 imports the flight distance information that is stored in the storage part 23 and is associated with the number of the club 8, and then has such flight distance information stored in the storage part 65 in connection with (in association with) the three-axis composite acceleration information of the left wrist P1 and the three-axis composite acceleration information of the hip P3.

Figure 18:
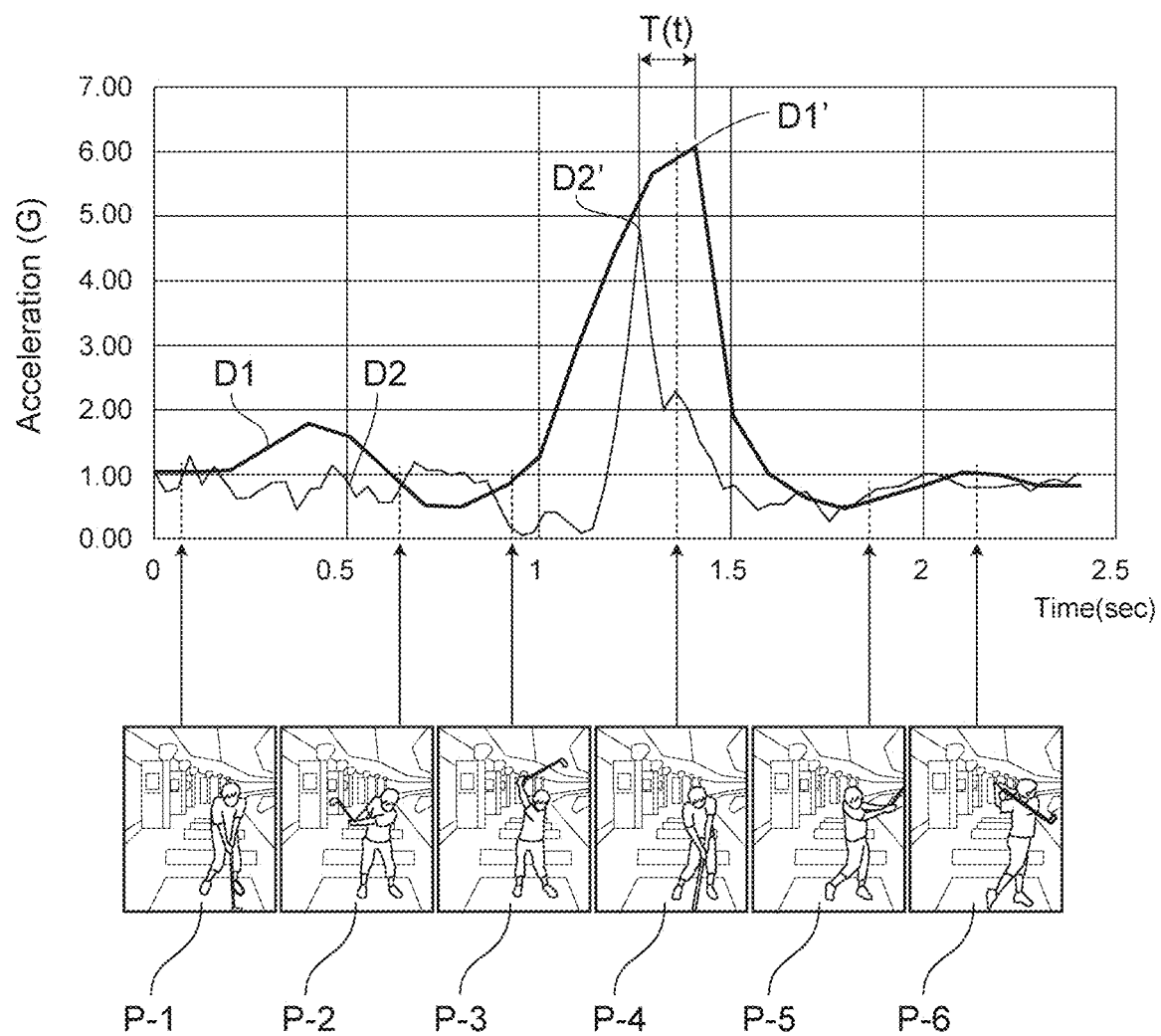
FIG. 18 is a diagram showing temporal changes in three-axis composite accelerations of the player's left wrist and hip in the embodiment of the present invention.

Here, the calculation of the lag during the swinging motions of the player P is described. FIG. 18 shows a polygonal line D1 indicating temporal changes in the three-axis composite acceleration of the left wrist P1 that has been calculated by the data analysis part 79; and a polygonal line D2 indicating temporal changes in the three-axis composite acceleration of the hip P3 that has likewise been calculated by the data analysis part 79. Further, shown below the graph of the polygonal lines D1 and D2 are a standstill state at address P-1, middle of the backswing (with the left wrist P1 starting to feel lighter) P-2, top P-3, impact P-4, follow P-5, and finish P-6, which are points during a series of swinging motions performed by the player P.

In this embodiment, a swinging motion(s) in which a peak D2' of the three-axis composite acceleration of the hip P3 temporally occurs earlier than a peak D1' of the three-axis composite acceleration of the left wrist P1 is considered to have a lag. If the peak D1' temporally occurs earlier than the peak D2' or if a time difference t between the peak D1' and the peak D2' is 0, it is considered that there is no lag. Moreover, the time difference t is referred to as a lag period T when there is a lag. The term "lag" here is different from the general expression used for uncocking the wrist during the downswing in golf. Here, FIG. 18 shows the three-axis composite accelerations of the left wrist P1 and hip P3 when there is a lag in the swing.

Based on the three-axis composite acceleration information of the player P's left wrist P1, the data analysis part 79 calculates the velocity of the player P's left wrist P1 via a given formula. As for the velocity of the left wrist P1, there are calculated, for example, an average swing velocity from the top P-3 to the impact P-4, and a velocity per unit time at the moment of the impact P-4. For example, an instantaneous velocity at the impact P-4 in this embodiment is V=5.75 m/s. Further, based on the three-axis composite acceleration information of the player P's hip P3, the data analysis part 79 calculates the velocity of the player P's hip P3 via a given formula. As for the velocity of the hip P3, there are calculated, for example, an average swing velocity, and a velocity per unit time at the moment of the impact P-4.

Further, based on the three-axis composite acceleration information of the player P's left wrist P1, the data analysis part 79 calculates the tilt of the player P's left wrist P1 via angles in three-axis directions. The tilt of the left wrist P1 is calculated at each of the standstill state at address P-1, middle of the backswing (with the left wrist P1 starting to feel lighter) P-2, top P-3, impact P-4, follow P-5, and finish P-6. For example, the angle(s) of the tilt of the left wrist P1 in the standstill state at address P-1 in this embodiment are such that: provided that a state with the arms vertically hanging is 0 degree, and that a θx axis is an axis vertically and downwardly extending from the wrist, a θy axis is an axis extending from the wrist toward the rear side of the body, and a θz axis is an axis extending from the wrist toward the left side of the body at address, then θx=4.2 deg, θy=−6.8 deg, and θz=12.6 deg. Thus, this is equivalent to a posture established in such a way that starting from a posture where the left hand is hanging vertically and the back of the left hand is oriented toward the left side at address, the left hand is twisted toward the hook grip side by 4.2 degrees, the wrist is stuck forward (toward the front side of the body) by 6.8 degrees, and the wrist is then moved inward (toward the right side) by 12.6 degrees from the posture with the hand hanging vertically and downwardly.

Further, based on the three-axis composite acceleration information of the player P's hip P3, the data analysis part 79 calculates the tilt of the player P's hip P3 via angles in three-axis directions. The tilt of the hip P3 is calculated at each of the standstill state at address P-1, middle of the backswing (with the left wrist P1 starting to feel lighter) P-2, top P-3, impact P-4, follow P-5, and finish P-6.

In this way, by continuously measuring the accelerations and angular velocities of the player P's various parts during the swinging motions, the measurement results synchronized by the data synchronization part 78 will be accumulated and stored in the storage part 65. From the measurement results accumulated, the data analysis part 79 will calculate the lag period T, the time at each motion point, and the accelerations, angular velocities and tilt of the left wrist P1, back P2 and hip P3, with regard to a swing that has resulted in the longest flight distance; and will then have these conditions stored in the storage part 65 as the player P's best swing (shot). The lag period T, the time at each motion point, and the accelerations, angular velocities and tilt of the left wrist P1, back P2 and hip P3, that are associated with such best swing can be displayed on the display part 12 of the portable terminal 2, and the player P can thus check the information of these analysis results. Further, there may also be calculated an average value(s) of the lag period T and the accelerations, angular velocities and tilt of the left wrist P1, back P2 and hip P3 with regard to a given number of swings (e.g. 10 times) that have resulted in long flight distances; the results thereof may then be displayed on the display part 12. Here, as long as it is information stored in the storge part 65, there can also be displayed on the display part 12 various types of information about swings that have resulted in short flight distances. Further, the data analysis part 79 may also utilize the corrected flight distance calculated by the corrected flight distance calculation part 39 instead of or together with the flight distance information.

Figure 19:
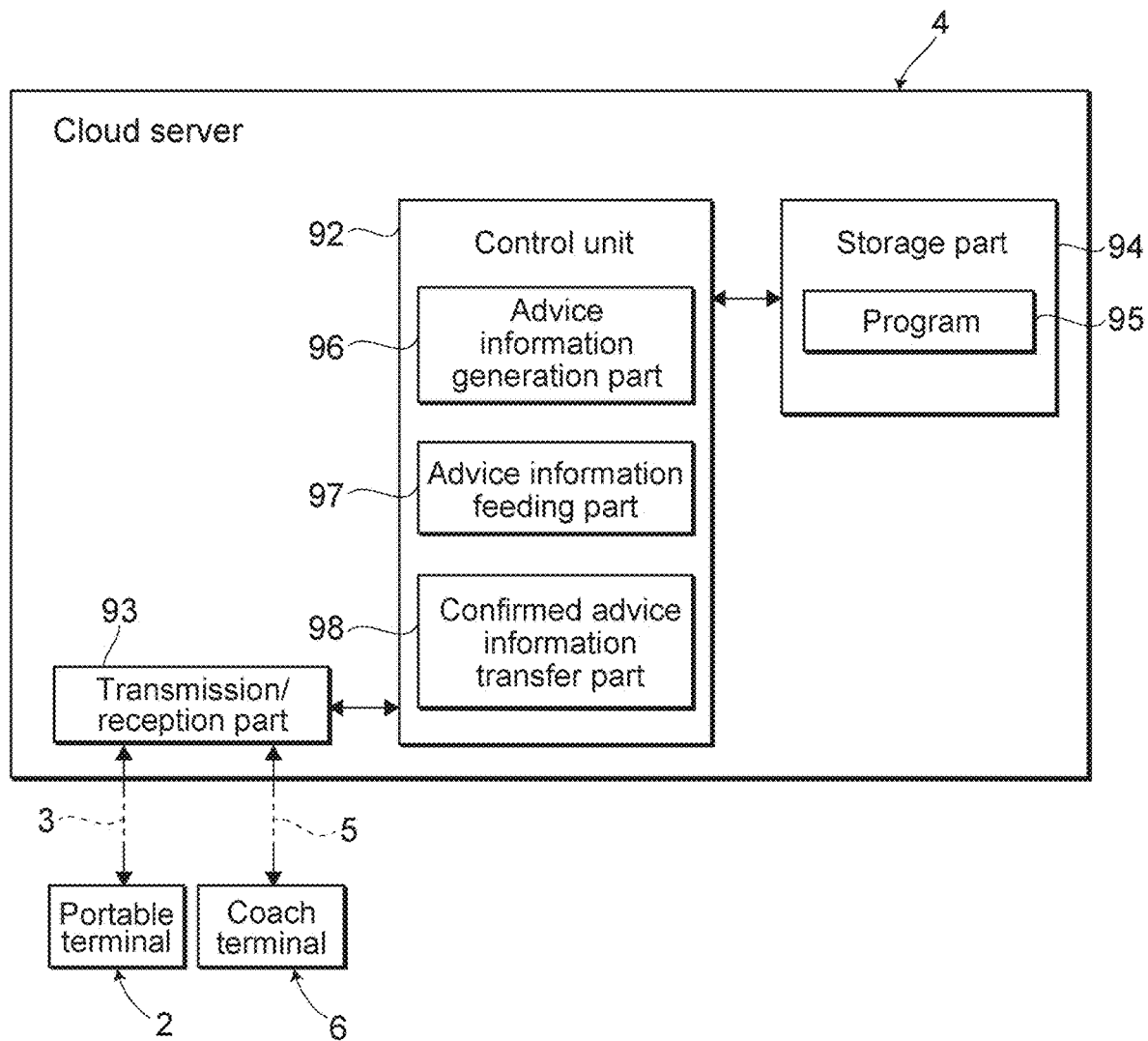
FIG. 19 is a block diagram showing an electrical configuration of a cloud server in the embodiment of the present invention.

FIG. 19 shows main configuration elements of the cloud server 4 as a server device. As shown in this diagram, the cloud server 4 is configured to be able to connect with the communication units 3 and 5 such as a network like the Internet and others; and includes a control unit 92, a transmission/reception part 93 and a storage part 94.

The control unit 92 includes a CPU (Central Processing Unit), and controls the entire cloud server 4 based on a program 95 stored in the storage part 94. Each function of the cloud server 4 is realized by the CPU executing arithmetic processing according to the program 95. Particularly, in this embodiment, in order to have the control unit 92 function as an advice information generation part 96, an advice information feeding part 97 and a confirmed advice information transfer part 98, incorporated in the program 95 is a remote advice program collaborating with the above-mentioned swing analysis program(s). In addition, by having these swing analysis program(s) and remote advice program executed by the control units 15, 45, 61 and 92 as computers, the remote lesson system 200 is realized.

The transmission/reception part 93 enables two-way communication between the cloud server 4 and the portable terminal 2 via the communication unit 3; and enables two-way communication between the cloud server 4 and the coach terminal 6 via the communication unit 5. As described above, since two-way communication is also possible between the player P's portable terminal 2 and wristwatch-type terminal 1, the cloud server 4 can transmit and receive various information to and from not only the portable terminal 2 but also the wristwatch-type terminal 1 or the like. In FIG. 19, only one portable terminal 2 is connected to the transmission/reception part 93 of the cloud server 4; in reality, the portable terminals 2 owned by many other players P who are at the golf course can be connected to one or more coach terminals 6.

The storage part 94 is configured using various storage devices such as a magnetic hard disk device and a semiconductor storage device. The storage part 94 enables writing and reading of, for example, swing measurement data that have been converted into a numerical UI (user interface) by the advice information generation part 96 as described later. In the remote lesson system 200, it is preferred that the cloud server 4 acquire in real time from the data analysis part 79 of the portable terminal 2 the player P's swing measurement data generated when he or she has performed a swinging motion(s) while actually playing on the course, and then have such data stored and saved in the storage part 94.

The advice information generation part 96 converts the swing measurement data from the data analysis part 79 of the portable terminal 2 into a numerical UI, and then has it stored and saved in the storage part 94. Further, the advice information generation part 96 has an artificial intelligence function using a multi-layered neural network that is not shown; by inputting into an input layer of such neural network the swing measurement data that are from the data analysis part 79 of the portable terminal 2 or have been read out from the storage part 94, advice information (text) about the player P's swinging motions will be generated and output from an output layer of the neural network. Here, there is no particular limitation as to what type of neural network the advice information generation part 96 uses to generate the advice information about the player P.

The advice information feeding part 97 transmits, via the communication unit 5, the advice information about the player P that has been generated and output by the advice information generation unit 96 from the transmission/reception part 93 to the coach terminal 6 owned by the player P's coach (instructor) at a lesson site. Further, based on the swing measurement data from the data analysis part 79, the advice information feeding part 97 generates swing measurement result display information with which the measurement results of the player P's swinging motions can be displayed on the display part 101 of the coach terminal 6, and then transmits such information, either directly or in an edited manner, from the transmission/reception part 93 to the coach terminal 6 owned by the player P's coach at the lesson site via the communication unit 5. Alternatively, upon receiving the swing measurement result display information transmitted from the data analysis part 79 of the portable terminal 2, the advice information feeding part 97 may transfer such information from the transmission/reception part 93 to the coach terminal 6 either directly or in an edited manner.

The confirmed advice information transfer part 98 is such that after the advice information feeding part 97 has transmitted the advice information about the player P to the coach terminal 6 by designating the coach terminal 6 as a designation, once it has been determined that the transmission/reception part 93 has received by return from such coach terminal 6 confirmed advice information which is either the advice information as it is or edited advice information, the confirmed advice information transfer part 98 will transfer such confirmed advice information from the transmission/reception part 93 to the portable terminal 2 owned by the player P via the communication unit 3.

Described in detail hereunder is the operation of the remote lesson system 200 having the above configuration. The remote lessons that can be realized by the remote lesson system 200 can be roughly classified into two categories which are "remote lessons" and "round lessons." First of all, the operation in the "remote lessons" is described: as shown in FIG. 1, every time the player P swings the golf club 8 during an actual round on the golf course, the waveform data of the acceleration and angular velocity of the left wrist P1 measured by the first inertial measurement part 16 of the wristwatch-type terminal 1, the waveform data of the acceleration and angular velocity of the hip P3 measured by the third inertial measurement part 62 of the portable terminal 2, and preferably the waveform data of the acceleration and angular velocity of the back P2 measured by the second inertial measurement part 46 of the 6-axis sensor unit 10 will be respectively imported into the control unit 61 of the portable terminal 2, and each waveform data synchronized on a time base by the data synchronization part 78 will then be stored and memorized in the storage part 65 by the data analysis part 79.

Further, the player P inputs the number of the club 8 from the sound collection part 21 and the operation part 25 of the wristwatch-type terminal 1 for each shot delivered to bit the ball 9 away by swinging the club 8. In this way, the flight distance calculation part 37 and corrected flight distance calculation part 39 of the wristwatch-type terminal 1 will import the positional information measured by the GPS reception part 17, the atmospheric pressure information measured by the atmospheric pressure measurement part 18, the atmospheric temperature information measured by the atmospheric temperature measurement part 19, and the altitude information measured by the altitude measurement part 20, and will then display on the display part 24 of the wristwatch-type terminal 1 an average flight distance or the like per each club that is obtained by taking height difference, atmospheric temperature and atmospheric pressure into consideration. The data of the flight distance and corrected flight distance for each shot that are calculated by the flight distance calculation part 37 and the corrected flight distance calculation part 39 will also be transmitted to the portable terminal 2. In response to this, the data analysis part 79 will associate each waveform data that have been synchronized on a time base by the data synchronization part 78 as above with the data of the flight distance and corrected flight distance that have been transmitted from the portable terminal 2, and will have them stored in the storage part 65 as the player P's swing measurement data serving as the analysis results by the data analysis part 79. From there, for example, the information of an analysis result associated with a swing (best shot) where the direction of the ball 9 after being hit was best controlled in the player P's intended direction and the shot resulted in a long flight distance, can be accurately displayed on the display part 12 of the portable terminal 2 by the data analysis part 79. As a result, the player P can make comparisons with the best shot at any time, and correctly judge which part of his or her swinging motion(s) is different from that of the best shot during the round.

Further, the analysis results by the data analysis part 79 i.e. the player P's swing measurement data will also be transmitted from the server transmission/reception part 68 to the cloud server 4 via the communication unit 3. The advice information generation part 96 of the cloud server 4 that has received such data via the transmission/reception part 93 will then convert the player P's swing measurement data into a numerical UI and have it stored in the storage part 94.

Upon receiving the swing measurement data from the data analysis part 79, the advice information feeding part 97 of the cloud server 4 will from there generate swing measurement result display information with which there can be displayed on the display part 101 of the coach terminal 6 the calculation results by the data analysis part 79 that serve as the measurement results of a series of motions in the player P's last swing. Instead of the cloud server 4, the data analysis part 79 may generate the swing measurement result display information and transmit it to the cloud server 4. In either case, at the lesson site, once the coach terminal 6 has received the swing measurement result display information from the cloud server 4, there will be displayed on the display part 101 of the coach terminal 6 a swing measurement result screen reflecting the calculation results by the data analysis part 79. As a result, the coach C can acquire and check in real time the results of the swing measurement data associated with the player P's swinging motions at a remote location that is distant from the golf course, such as a lesson site. Further, if necessary, guidance can be given to the player P as remote advice(s), whereby a "remote lesson" via the cloud server 4 can be easily realized.

Figure 20:
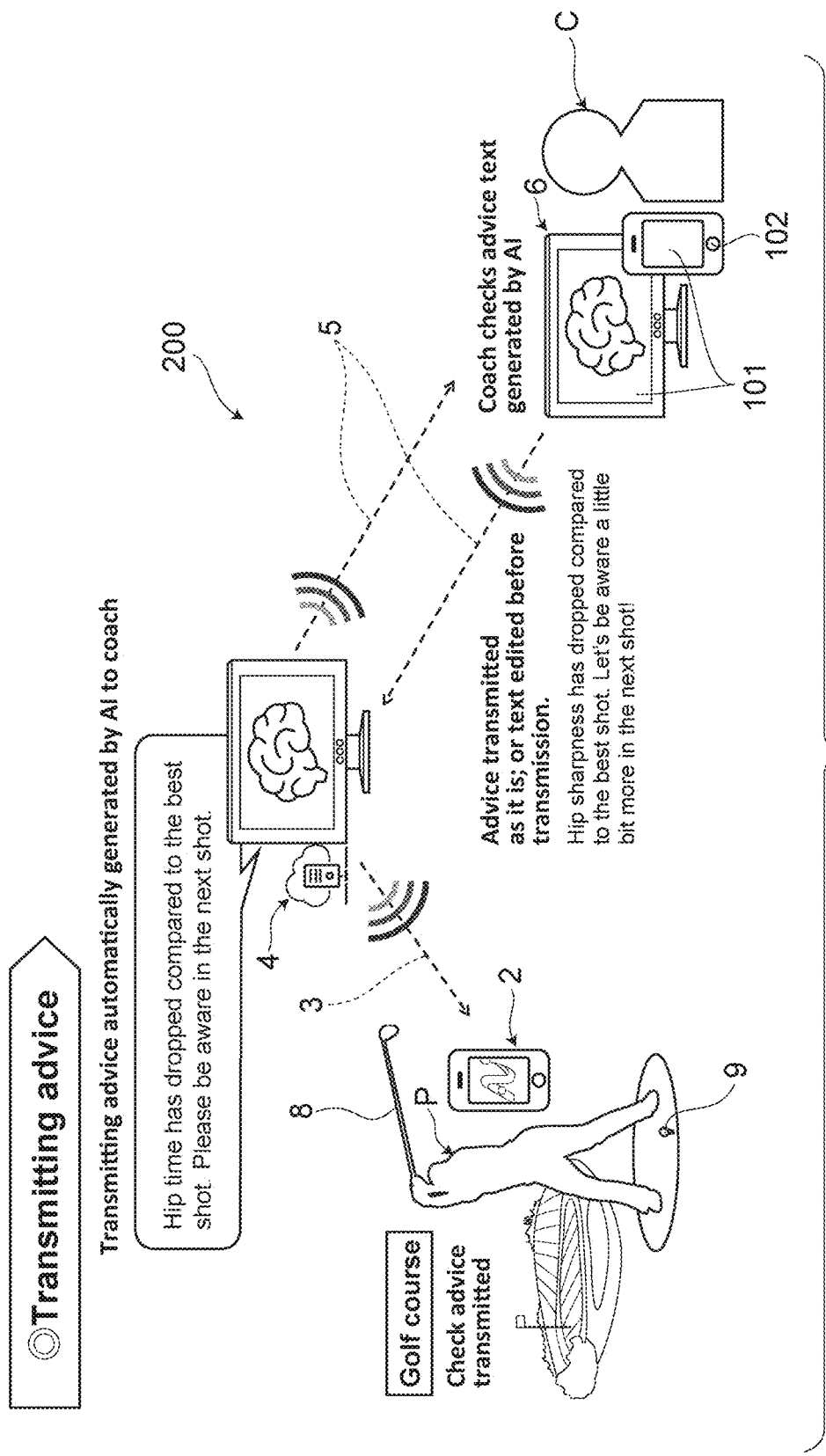
FIG. 20 is an explanatory diagram showing an overview of the remote lesson system of the embodiment of the present invention, particularly an overview of a "round lesson."

Next, the operation in the "round lessons" is described. FIG. 20 shows an outline of a "round lesson" realized by the remote lesson system 200 of this embodiment. As shown in this diagram, the advice information generation part 96 of the cloud server 4 will input the swing measurement data transmitted from the data analysis part 79 of the portable terminal 2 in the earlier "remote lesson" or the swing measurement data stored and saved in the storage part 94 into the input layer of the neural network incorporated in the advice information generation part 96, and will then output proper advice information that is related to the player P's swinging motions and has been automatically generated by the AI (artificial intelligence) utilizing the neural network from the output layer of the neural network to the advice information feeding part 97.

In response to this, the advice information feeding part 97 will transmit advice information generated by the advice information generation part 96, such as a text sentence saying "Hip time has dropped compared to the best shot. Please be aware in the next shot." from the transmission/reception part 93 to the coach terminal 6 via the communication unit 5. As a result, at a remote location that is distant from the golf course, such as a lesson site, the coach C can check the text of the advice information generated by the AI of the advice information generation part 96 on, for example, the screen of the display part 101.

Further, after the coach terminal 6 has received the advice information from the advice information feeding part 97, the coach C will be able to perform input operations on the operation part 102 of such coach terminal 6 to transmit by return to the transmission/reception part 93 of the cloud server 4 confirmed advice information which is either the advice information as it is or information obtained by editing the text of such advice information (e.g. "Hip sharpness has dropped compared to the best shot. Let's be aware a little bit more in the next shot!"). In response to this, the confirmed advice information transfer part 98 of the cloud server 4 will transfer the confirmed advice information from the coach C to the portable terminal 2 so that the player P can read the text of the confirmed advice information sent from the cloud server 4 on, for example, the screen of the display part 12.

In this way, in the "round lesson" via the cloud server 4, while the player P is actually playing golf on the golf course, the cloud server 4 acquires in real time the swing measurement data associated with the swinging motions, whereby the advice information generated therefrom can then be provided to the coach terminal 6. Further, the swing measurement data can be acquired not only when the player P is playing on the golf course, but also likewise when the player P has performed a swinging motion(s) during a lesson at the lesson site, where the swing measurement data are to be stored and saved in the storage part 94 of the cloud server 4 each time. Therefore, using the AI function incorporated in the advice information generation part 96, by making comparisons to a swing associated with the best shot in the lesson, and then by automatically transmitting from the cloud server 4 to the coach terminal 6 the advice information associated with the last swing on the golf course, appropriate lesson guidance can be given based on the confirmed advice information from the coach C to the player P; for example, when 10 portable terminals 2 owned by different players P are connected to the cloud server 4 via the communication unit 3, one single coach C can simultaneously provide lesson guidance to the 10 players P by utilizing the coach terminal 6 connected to the cloud server 4 via the communication unit 5.

Further, as a modified example, swing measurement data of the best shots delivered by the swinging motions of multiple professional players P may be respectively stored and saved in the storage part 94 of the cloud server 4 in advance, and an item such as "Swing data by Pro" may be displayed on the display part 12 of the portable terminal 2 and the display part 101 of the coach terminal 6, if necessary. In this case, by tapping the operation part 13 of the portable terminal 2 and the operation part 102 of the coach terminal 6 on such item, a professional player to be referred to can be selected, and information of analysis results associated with the selected professional player P's best shot can be displayed on the display part 12 of the portable terminal 2 and the display part 101 of the coach terminal 6.

Figure 21:
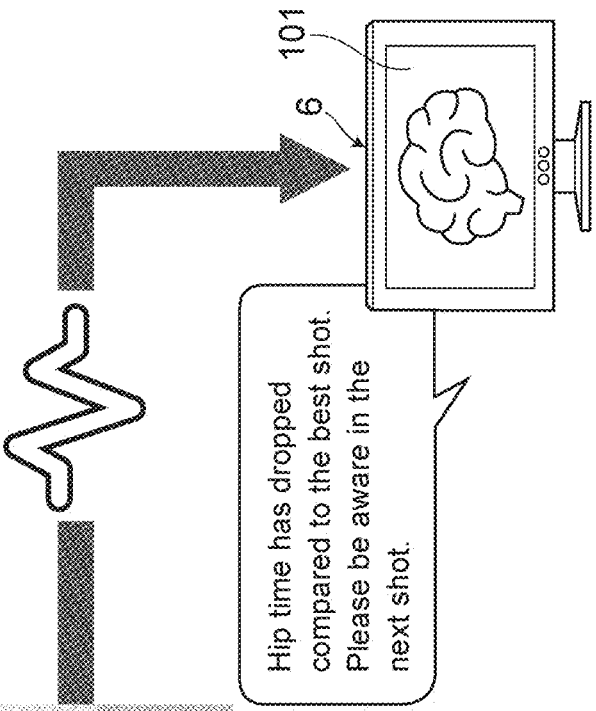
FIG. 21 is an explanatory diagram showing an advice information generation procedure by an advice information generation part in the embodiment of the present invention.
Figure 21:
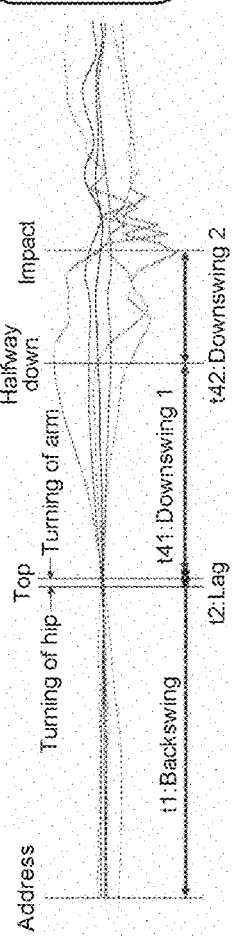

FIG. 21 is a diagram showing a procedure for generating the advice information, using the AI function of the advice information generation part 96. As shown in this diagram, as the swing measurement data of the swinging motions that have been performed by the player P on the golf course and at the lesson site so far, stored and accumulated in the storage part 94 of the cloud server 4 are a hip speed h1, hip time (so-called sharpness) h2 and hip turn angle h3 that are each calculated from the waveform data $\omega x3$, $\omega y3$ and $\omega z3$ of the hip P3's three-axis angular velocities, in addition to the backswing period t1, the lag period t2, the time period of the first half of the downswing t41, and the time period of the first half of the downswing t42 that are shown in FIG. 10.

Upon receiving the swing measurement data associated with the player P's swinging motions from the data analysis part 79 of the portable terminal 2, the advice information generation part 96 will input such data into the input layer of the neural network as the swing measurement data of a "current shot," and analyze the swing measurement data of such "current shot" with the AI function enabled by the neural network. Specifically, the neural network of the advice information generation part 96 will extract, from the swing measurement data that have been stored and accumulated so far in the storage part 94, the swing measurement data of the "best shot" that has resulted in the longest flight distance with an identical number of the golf club 8; and then compare the backswing period t1, the lag period t2, the time period of the first half of the downswing t41, the time period of the first half of the downswing t42, the hip speed h1, the hip time h2 and the hip turn angle h3 as data numerical values contained therein, with the backswing period t1, the lag period t2, the time period of the first half of the downswing t41, the time period of the first half of the downswing t42, the hip speed h1, the hip time h2 and the hip turn angle h3 as data numerical values contained in the swing measurement data of the "current shot," by calculating the differences between the two sets of values. Then, the AI function of the neural network will automatically generate the advice information from such comparison result.

For instance, as illustrated by an example shown in FIG. 21, the differences between the swing measurement data of the "best shot" and the swing measurement data of the "current shot" were each within 0.02 s (seconds) with regard to the backswing period t1, the lag period t2, the time period of the first half of the downswing t41, and the time period of the first half of the downswing t42; whereas the differences between the swing measurement data of the "best shot" and the swing measurement data of the "current shot" were each as wide as −15° (degrees)/s, +0.05 s and −0.6° with regard to the hip speed h1, the hip time h2 and the hip turn angle h3. Upon receiving such analysis results of the swing measurement data that are provided by the AI function, the advice information generation part 96 will generate and output, for example, the advice information "Hip time has dropped compared to the best shot. Please be aware in the next shot."

In addition, in this embodiment, other than the above-mentioned remote advice information by the remote lesson system 200, local advice information by an advice diagnostic information presentation system mainly composed of the wristwatch-type terminal 1 and the portable terminal 2 is appropriately provided to the player P. Specifically, by having the player P input the course information of the golf course either by voice via the sound collection part 21 or by the operation on the operation part 25, the advice calculation part 42 will read out the map information 35 of the corresponding course from the storage part 23 and display it on the display part 24. Here, the displaying of the map information 35 may also be such that by measuring the positional information of the player P wearing the wristwatch-type terminal 1, the map information 35 will be automatically displayed on the display part 24 once it has been confirmed that the player P has entered the corresponding course based on the positional information of the corresponding course that is stored in the storage part 23 in advance.

Further, hazard information such as the bunker G4 and the pond G5 is read out from the map information 35, and notifications will be made on such hazard information. The hazard information includes, for example, positional information of the bunker G4, the pond G5 and the like, and distance information of distances from the current position to the bunker G4, the pond G5 and the like; and is, for example, to be displayed on the display part 24 by a text such as "Watch out for the left bunker!" or to be notified to the player by voice via the notification part 26. Here, since the map information 35 of the course shown on the display part 24 is displayed in color in such a manner that the tee ground G1, fairway G2, rough G3, bunker G4, pond G5 and green G6 are respectively shown in different colors, the hazard information can be visually and easily confirmed.

Once the fact that the player P is about to deliver a shot has been input into the wristwatch-type terminal 1 either by voice via the sound collection part 21 or by the operation on the operation part 25, the advice calculation part 42 will calculate a distance to the green G6 based on the positional information of the player P and the map information 35. Further, the player P's average flight distance and average corrected flight distance will be read out from the storage part 23, and a recommended number of the club 8 that is suitable for the distance to the green G6 will be presented. At that time, the player P's past average flight distance marked using the recommended number of the club 8 will be displayed on the map information 35 of the course that is shown on the display part 24, in the form of an arc line 85 and a numerical value 86 (see FIG. 3).

In addition, the advice calculation part 42 also calculates, for example, the ratio and tendency of deviation of the player P's shots in the left or right direction when using the recommended club 8. The advice calculation part 42 reads out the ratio of deviation of the player P's shots in the left or right direction from the storage part 23, and then presents it via the display part 24 or the notification part 26. As for a method to present the deviation in the left or right direction, the ratio of deviation may be displayed on the display part 24, or notified to the player by voice via the notification part 26; further, the tendency of the player P's shots is calculated from the ratio of deviation, and such tendency can then, for example, be displayed on the display part 24 with words such as "Deviation in left direction 65%, Caution!" or notified to the player by voice via the notification part 26.

Also, based on the analysis result data from the data analysis part 79 of the portable terminal 2, the advice calculation part 42 will calculate an average length of a lag period T associated with, for example, a player P's past shot that resulted in a long flight distance, or a past shot exhibiting no deviation in the left or right direction; the time at each motion point; the acceleration, angular velocity and tilt of the left wrist P1; the acceleration, angular velocity and tilt of the back P2; and the acceleration, angular velocity and tilt of the hip P3. These calculated results may then, for example, be displayed on the display part 24 or notified to the player via the notification part 26.

Further, if the height difference H is known in advance i.e. if whether the player P's next shot will be an uphill shot or a downhill shot is known in advance, by inputting such intention into the wristwatch-type terminal 1 by voice or by the operation on the operation part 25, there can be read out a player P's past average flight distance that is stored in the storage part 23 and is associated with such height difference H with regard to the player's uphill or downhill shot, and this average flight distance can then be displayed on the display part 24.

In addition, by inputting the shot point condition (e.g. tee ground G1, fairway G2, rough G3, bunker G4, pond G5, uphill, downhill, strength of wind, direction of wind) into the wristwatch-type terminal 1 by voice or by the operation on the operation part 25, there can be read out a player P's past average flight distance that is stored in the storage part 23 and is associated with the very condition the player is currently in, and this average flight distance can then be displayed on the display part 24.

The local advice information calculated by the advice calculation part 42 is calculated based on the information stored in the storage parts 23 and 65; however, for example, the average flight distance may also be calculated in such a manner where information of failed shots that resulted in extremely short flight distances is excluded from the information of the past shots, and the average flight distance thus calculated is then notified to the player. Further, there may also be employed a configuration where such local advice information is transferred from the cloud server 4 to the coach terminal 6 so that the coach C can also view it on the screen of the display part 101.

The remote lesson system 200 of this embodiment can also be used for regular lessons taught at golf schools where the coach C coaches the player P at a lesson site. As is the case with that on the golf course as described above, even at a lesson site, the swing measurement data gathered when the player P has performed a swinging motion(s) in front of the coach C will be transmitted from the portable terminal 2 to the cloud server 4. On the cloud server 4 side, the advice information generation part 96 mainly generates and outputs the advice information with the aid of the AI function, by analyzing the sensor output from the first inertial measurement part 16 serving as an arm sensor, and the sensor output from the third inertial measurement part 62 serving as a hip sensor; the advice information feeding part 97 generates and outputs the swing measurement result display information. As a result, a perfect lesson taught by the coach C to the player P can be realized even at a lesson site. Of course, even in such case, the advice information generation part 96 will generate and output advice information suitable for the player P taking the lesson, by comparing the swing measurement data of the best shot during the lesson to the swing measurement data of the "current shot" delivered by the player P's Jast swing at the lesson site.

Further, in conjunction with the abovementioned local advice information, the advice information feeding part 97 provided in the cloud server 4 may also be configured to be able to compare and check the swing measurement data of the best shot in the past that resulted in the longest flight distance and exhibited no deviation in the left or right direction, and the swing measurement data associated with the player P's last swing at the lesson site.

As described above, the remote lesson system 200 of this embodiment is comprised of the portable terminal 2 as a player terminal owned by the player P; and the cloud server 4 as a server device capable of communicating with the portable terminal 2. The portable terminal 2 includes the data analysis part 79 as a measurement data feeding part for transmitting, from the portable terminal 2 to the cloud server 4, the swing measurement data as measurement data that have been collected by measuring the player P's motions during the play and quantified. The cloud server 4 includes the advice information generation part 96 that has the artificial intelligence (AI) function using the multi-layered neural network, and generates and outputs the advice information associated with the player P's motions from the output layer of the neural network when the swing measurement data have been input into the input layer of the neural network; and the advice information feeding part 97 for transmitting such advice information to the coach terminal 6 which is a terminal other than the portable terminal 2.

In this way, when the player P has actually performed a swinging motion(s) during the play, the cloud server 4 will acquire in real time the swing measurement data measured by the portable terminal 2, whereby the advice information generation part 96 will then transmit the advice information associated with the player P's swinging motions to the coach terminal 6 at a remote location that is distant from the player P. At that time, using the artificial intelligence function, the advice information generation part 96 will, for example, compare the swing measurement data sent from the portable terminal 2 with the swing measurement data of the player P's best swing during the lesson taught by the coach C, and then automatically generate and output the advice information from the comparison result, thereby making it possible for the player P to receive precise advices with regard to his or her swinging motions while playing at a remote location.

Further, in the case of the remote lesson system 200 of this embodiment, the cloud server 4 further includes the confirmed advice information transfer part 98 that is configured in such a manner that after the advice information feeding part 97 has transmitted the advice information to the coach terminal 6, the confirmed advice information transfer part 98 will transfer the confirmed advice information to the portable terminal 2 upon receiving such confirmed advice information from the coach terminal 6.

Here, upon receiving the advice information from the cloud server 4, the coach terminal 6 will by return transmit such advice information as it is to the cloud server 4, or transmit edited advice information to the cloud server 4; in either case, this information will then be transferred from the cloud server 4 to the portable terminal 2 as the confirmed advice information about the player P. Thus, advices can be precisely provided from the coach terminal 6 at a remote location to the portable terminal 2 owned by the player P.

INDUSTRIAL APPLICABILITY

The remote lesson system 200 of this embodiment is not only aimed at the golf player P as described above, but can also be applied to other athletes as measurement targets from various sports such as high-jump, baseball, swimming, tennis, figure skating, running, and Japanese archery.

DESCRIPTION OF THE SYMBOLS

1 wristwatch-type terminal (player terminal)
2 Portable terminal (player terminal)
4 Cloud server (server device)
6 Coach terminal
10 6-axis sensor unit (player terminal)
16 First inertial measurement part
46 Second inertial measurement part
62 Third inertial measurement part
79 Data analysis part (measurement data feeding part)
96 Advice information generation part
97 Advice information feeding part
98 Confirmed advice information transfer part
200 Remote lesson system

What is claimed is:

1. A remote lesson system comprising:
a player terminal owned by a player; and
a server device capable of communicating with the player terminal,
wherein the player terminal includes a measurement data feeding part that transmits measurement data that have been collected by measuring the player's motions during play and quantified to the server device, and
wherein the server device includes:
an advice information generation part that has an artificial intelligence function using a neural network, and generates and outputs advice information associated with the player's motions from an output layer of the neural network when the measurement data have been input into an input layer of the neural network; and an advice information feeding part that transmits the advice information to a coach terminal as a terminal other than the player terminal.

2. The remote lesson system according to claim 1, wherein the server device further includes a confirmed advice information transfer part that is configured in such a manner that after the advice information feeding part has transmitted the advice information to the coach terminal, the confirmed advice information transfer part transfers confirmed advice information to the player terminal upon receiving the confirmed advice information from the coach terminal.

3. The remote lesson system according to claim 2, wherein the coach terminal is capable of editing the advice information received, and transferring edited confirmed advice information to the player terminal.

4. The remote lesson system according to claim 1, wherein the player terminal is a wristwatch-type terminal to be worn on the player's arm, a portable terminal to be received in the player's clothing, and a 6-axis sensor unit to be worn on the player's back, wherein the wristwatch-type terminal includes a first inertial measurement part that detects the player's motions, the 6-axis sensor unit includes a second inertial measurement part that detects the player's motions, and the portable terminal includes a third inertial measurement part that detects the player's motions.

5. The remote lesson system according to claim 4, wherein the wristwatch-type terminal and the 6-axis sensor unit are capable of performing two-way communication with the portable terminal, and the portable terminal is capable of synchronizing play data acquired from the wristwatch-type terminal with play data acquired from the 6-axis sensor unit.

6. The remote lesson system according to claim 4, wherein the player's motions to be detected by the first inertial measurement part are an acceleration of the player's wrist in directions of three orthogonal axes and an angular velocity of the player's wrist around each of the three orthogonal axes, the player's motions to be detected by the second inertial measurement part are an acceleration of the player's back in directions of three orthogonal axes and an angular velocity of the player's back around each of the three orthogonal axes, and the player's motions to be detected by the third inertial measurement part are an acceleration of the player's hip in directions of three orthogonal axes and an angular velocity of the player's hip around each of the three orthogonal axes.

* * * * *